US012644538B2

(12) United States Patent
Burkholder et al.

(10) Patent No.: US 12,644,538 B2
(45) Date of Patent: Jun. 2, 2026

(54) DEBRIS-TOLERANT SEALING VALVE

(71) Applicant: Sierra Space Corporation, Broomfield, CO (US)

(72) Inventors: Rick Burkholder, Broomfield, CO (US); Nathan Haggerty, Broomfield, CO (US); Jerry Chang, Broomfield, CO (US); Jared Koch, Broomfield, CO (US); Kevin Rogers, Broomfield, CO (US)

(73) Assignee: Sierra Space Corporation, Louisville, CO (US)

( * ) Notice: Subject to any disclaimer, the term of this patent is extended or adjusted under 35 U.S.C. 154(b) by 98 days.

(21) Appl. No.: 18/646,325

(22) Filed: Apr. 25, 2024

(65) Prior Publication Data

US 2024/0360917 A1      Oct. 31, 2024

Related U.S. Application Data

(60) Provisional application No. 63/499,082, filed on Apr. 28, 2023.

(51) Int. Cl.
*F16K 31/524*      (2006.01)
*C22B 5/00*      (2006.01)
*F16K 43/00*      (2006.01)

(52) U.S. Cl.
CPC ........ *F16K 31/52408* (2013.01); *F16K 43/00* (2013.01); *C22B 5/00* (2013.01)

(58) Field of Classification Search
CPC .......... F16K 31/524; F16K 43/00; F16K 3/10; F16K 3/04; F16K 3/06; F16K 3/085; C22B 5/00
See application file for complete search history.

(56) References Cited

U.S. PATENT DOCUMENTS

| | | | | |
|---|---|---|---|---|
| 1,633,161 | A | * | 6/1927 | Cavenagh ................. F16K 3/10 |
| | | | | 138/45 |
| 2,541,715 | A | * | 2/1951 | Oestreicher ............. F16K 5/163 |
| | | | | 251/161 |
| 3,640,310 | A | * | 2/1972 | Erlich ................... F16K 11/074 |
| | | | | 210/411 |
| 5,653,419 | A | * | 8/1997 | Uchisawa ......... F16K 31/52408 |
| | | | | 92/136 |

(Continued)

*Primary Examiner* — Daphne M Barry
(74) *Attorney, Agent, or Firm* — Mintz Levin Cohn Ferris Glovsky and Popeo, P.C.

(57) ABSTRACT

Methods, devices, and systems are described for a system including a rotation motor configured to rotate a valve seal holder, the valve seal holder having at least one pass-through interface and closed-off interface, a camshaft coupled to the valve seal holder, and a controller communicatively coupled to the rotation motor and the camshaft. The controller is configured to separate at least one of the pass-through interface or the closed-off interface of the valve seal holder from the seat configured to interface with the external system. The controller is configured to rotate, using the rotation motor, the valve seal holder until at least one of the pass-through interface or the closed-off interface is aligned with the seat. The controller is configured to compress the at least one of the pass-through interface or the closed-off interface against the seat to create a seal over the seat.

19 Claims, 14 Drawing Sheets

(56)           References Cited

U.S. PATENT DOCUMENTS

| | | | | |
|---|---|---|---|---|
| 6,098,646 | A * | 8/2000 | Hennemann | B01F 23/49 |
| | | | | 137/554 |
| 6,193,213 | B1 * | 2/2001 | Stearns | F16K 3/188 |
| | | | | 137/625.46 |
| 6,776,394 | B2 * | 8/2004 | Lucas | F16K 3/10 |
| | | | | 251/301 |
| 7,654,505 | B2 * | 2/2010 | Schoen | F16K 3/188 |
| | | | | 251/193 |
| 7,762,526 | B2 * | 7/2010 | Coleman | F16K 31/043 |
| | | | | 251/301 |
| 7,987,822 | B2 * | 8/2011 | Fishman | G05D 23/1925 |
| | | | | 123/41.1 |
| 8,733,734 | B2 * | 5/2014 | Nakamura | F16K 3/188 |
| | | | | 251/328 |
| 9,435,440 | B2 * | 9/2016 | Gamache | F16K 5/161 |
| 10,024,439 | B2 * | 7/2018 | Young | F16K 1/52 |

* cited by examiner

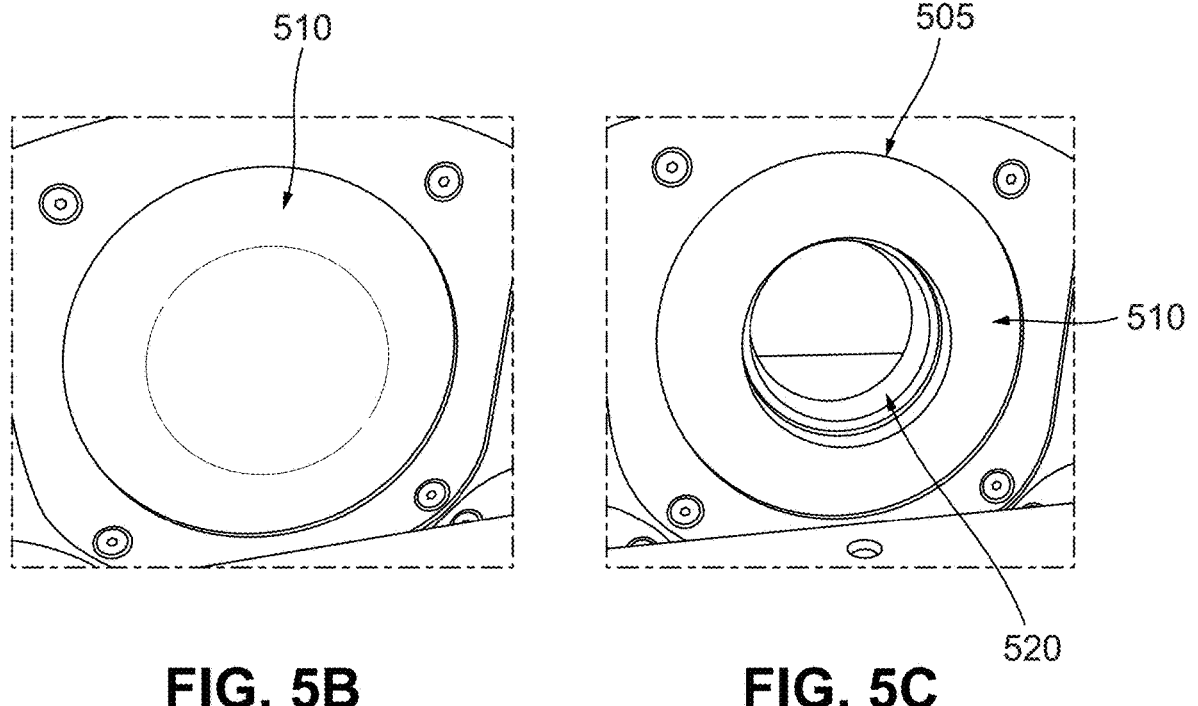
FIG. 5B          FIG. 5C

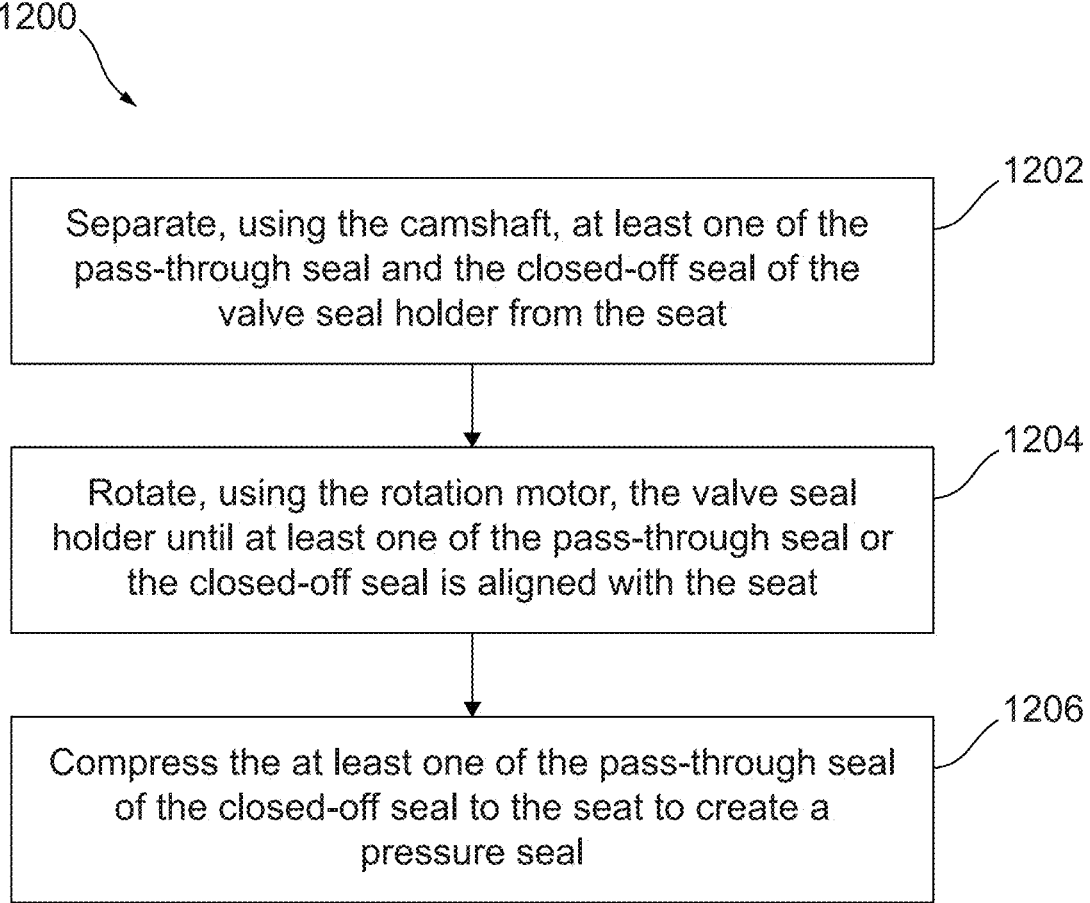

1200

Separate, using the camshaft, at least one of the pass-through seal and the closed-off seal of the valve seal holder from the seat

1202

Rotate, using the rotation motor, the valve seal holder until at least one of the pass-through seal or the closed-off seal is aligned with the seat

1204

Compress the at least one of the pass-through seal of the closed-off seal to the seat to create a pressure seal

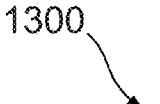
1300
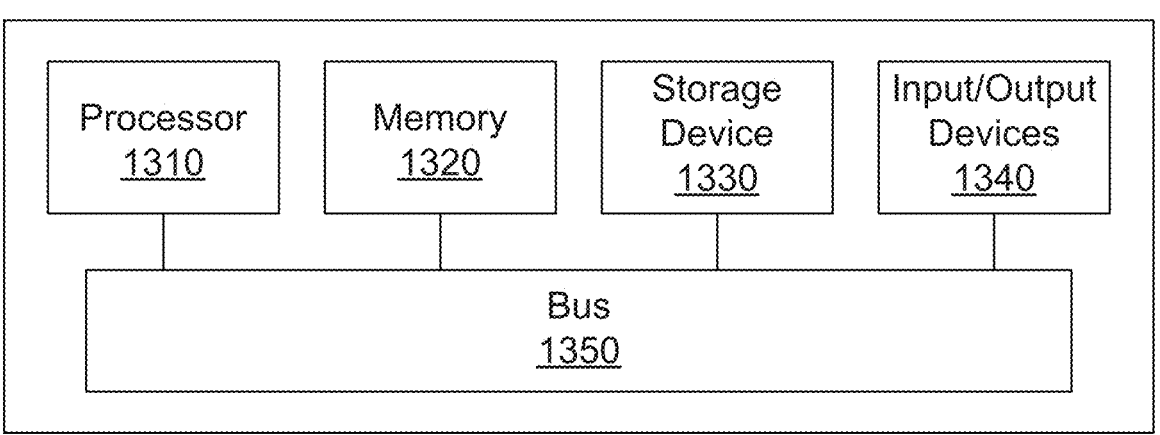
| Processor 1310 | Memory 1320 | Storage Device 1330 | Input/Output Devices 1340 |
Bus
1350
FIG. 13

DEBRIS-TOLERANT SEALING VALVE

CROSS-REFERENCE TO RELATED APPLICATIONS

This application claims priority to U.S. Provisional Application No. 63/499,082 entitled "DEBRIS-TOLERANT SEALING VALVE" and filed on Apr. 28, 2023, the disclosure of which is incorporated herein by reference in its entirety.

TECHNICAL FIELD

The present disclosure relates generally to valves, and more particularly, to apparatuses and systems for valves tolerant of flow path debris and ambient debris.

BACKGROUND

Advances in space exploration have identified a great need for efficient extraterrestrial metal processing to expand human exploration and construction capabilities. Processing extraterrestrial metals substantially reduces the costs and risks of bringing supplies from Earth while allowing for efficient use of resources to enable endeavors in space exploration. Extraterrestrial surfaces are covered by a granular material known as regolith that includes extraterrestrial metals. Regolith may be deoxidized to obtain oxygen. If oxygen is extracted, the regolith could be used to facilitate construction. Effectively processing regolith supports a permanent human presence on the moon and other planets.

Processing regolith has been adapted for use in spaceflight to produce oxygen. Metallic oxides in the regolith are mixed with methane to produce carbon monoxide under heat. The carbon monoxide is then chemically converted to oxygen in a downstream process. The reaction requires a heat source to heat the regolith to >1600 C to produce the carbothermal reaction necessary to extract the carbon monoxide for conversion to oxygen. But this manufacturing process is messy and difficult due to the extremely abrasive fine materials in regolith. The abrasive nature of regolith makes wears out conventional valves quickly, especially those that are needed for creating a seal. Regolith in the flow paths of carbothermal reduction systems destroys conventional valves controlling the intake and flow of regolith to be processed. Regolith in the ambient environment makes creating seals difficult, especially for valves that need to prevent oxygen or other gas leaks. Efficient valves and systems are needed for effectively processing regolith and for other industries in dealing with dusty, harsh conditions in extraterrestrial environments.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5B depicts an example of a closed-off interface configured to be situated at a station of the valve seal holder;

FIG. 5C depicts an example of a pass-through valve configured to be situated at a station of the valve seal holder;

FIG. 12 depicts an example of a flowchart of a method configured to compress either the pass-through seal or the closed-off seal to the seat to create a seal; and FIG. 13 depicts a block diagram illustrating a computing system consistent with implementations of the current subject matter.

DETAILED DESCRIPTION

Figure 1:
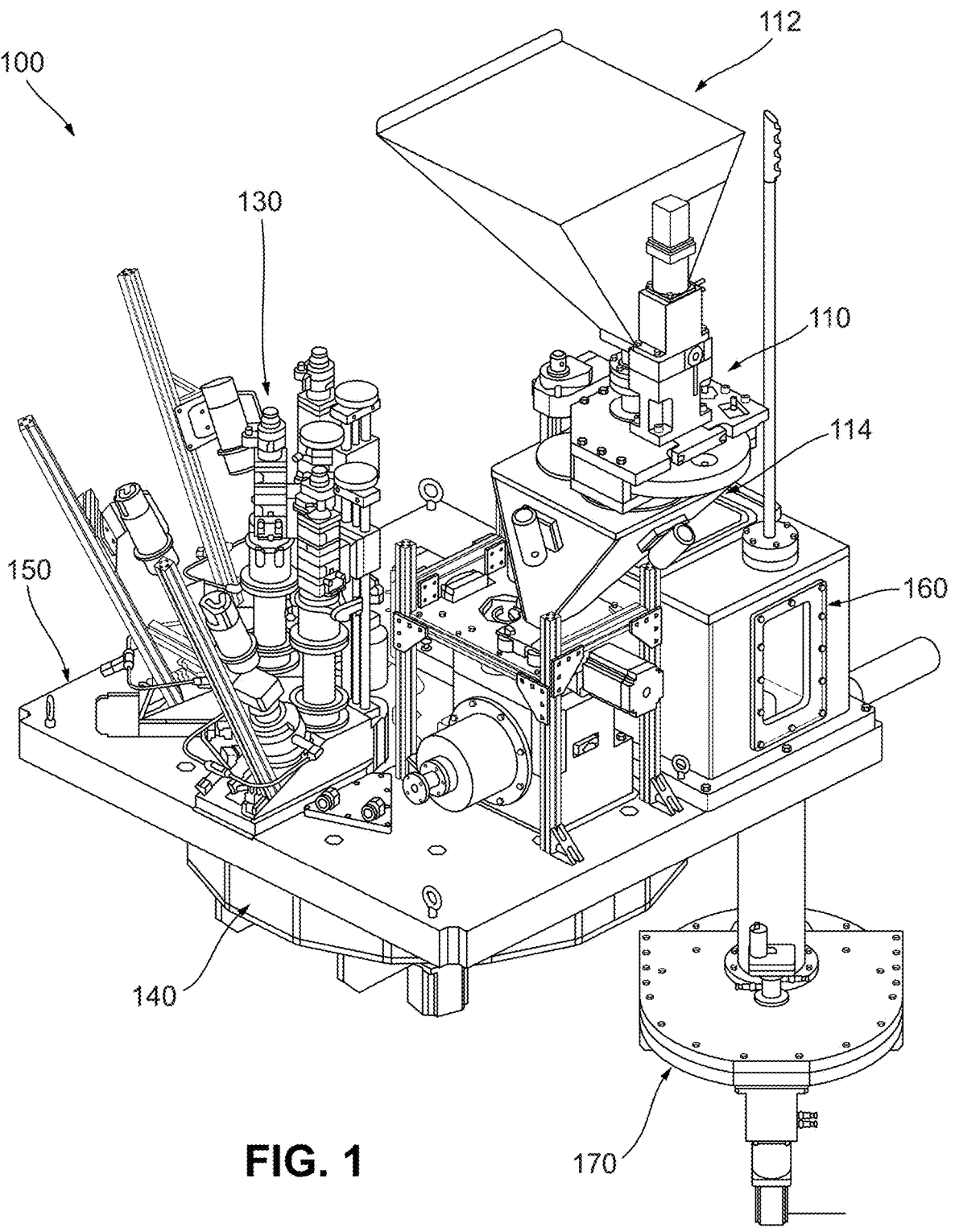
FIG. 1 depicts an example of a carbothermal reduction system configured to reduce metallic oxides from regolith using a concentrated light source.

The methods, systems, and apparatuses described herein are for debris-tolerant valves configured to create a seal for either a flow path or a pressurized chamber. In the following detailed description, reference is made to the accompanying drawings, which form a part hereof. In the drawings, similar symbols generally identify similar components, unless context dictates otherwise. The illustrative alternatives described in the detailed description, drawings, and claims are not meant to be limiting. Other alternatives may be used and other changes may be made without departing from the spirit or scope of the subject matter presented here. It will be readily understood that the aspects, as generally described herein, and illustrated in the Figures, can be arranged, substituted, combined, and designed in a wide variety of different configurations, all of which are explicitly contemplated and make part of this application.

The debris-tolerant valves described herein are configured to create reliable seals for abrasive fine materials in a flow path and in the ambient environment (e.g., earth, underwater, moon, etc.). The debris-tolerant valves utilize a deforming material configured to be compressed against a seat that may be located at an end of either a flow path or a pressurized chamber of an external system. In some embodiments, the debris-tolerant valve may utilize a non-deforming material. The debris-tolerant valve forms the seal without using shearing forces to provide a reliable seal in harsh extraterrestrial conditions and for messy regolith processing in carbothermal reduction systems. The debris-tolerant valve may be configured to create a seal with regolith flowing through a flow path and regolith in the ambient environment. Unlike other hard particles, the regolith is sharp and contains many agglutinates. Even worse, the fine particles of regolith are easily electrostatically charged, resulting in the regolith easily adhering to surfaces. This combination of conditions causes significant wear on any moving mechanisms, especially valves. Valves may be required to create seals for carbothermal reduction systems, oxygen systems, and other important extraterrestrial operations. Conventional valves quickly fail due to the regolith abrasion against the sealing surfaces, even when exotic coatings and hardened materials are used.

Unlike conventional valves, debris-tolerant valves are durable and dependable, especially for carbothermal reduction systems. Carbothermal reduction systems are a type of technology used to convert metal oxides into metals through the application of heat. The reduction process releases carbon monoxide that may be later converted into oxygen. Valves are needed to transport the carbon monoxide and oxygen into pressurized chambers. Additionally, valves are needed to control the intake of regolith into the carbothermal reduction system. Unlike conventional systems, debris-tolerant valves described herein are tolerant of regolith and well-suited for carbothermal reduction systems configured to process regolith for mass-producing carbon monoxide and, subsequently, oxygen. The debris-tolerant valve can be used in an inlet valve assembly and an outlet valve assembly on carbothermal reduction systems. The debris-tolerant valve can allow continuous processing of regolith and production of carbon monoxide and minimize any downtime of the system for maintaining valves.

The debris-tolerant valve may include a valve seal holder configured to couple to a rotation motor and a camshaft. The rotation motor may be configured to rotate the valve seal holder and the camshaft may be configured to apply force to the valve seal holder. The valve seal holder may be a disc having a plurality of stations arranged around the disc. Each of the stations may include at least one of a pass-through interface or a closed-off interface. The rotation motor may be configured to rotate through the plurality of stations. A controller may control the rotation motor to select either a pass-through interface or a closed-off interface. The debris-tolerant valve may be configured to cycle repeatedly through a plurality of stations.

The pass-through interface and the closed-off interface may correspond to an open state of the valve and a closed state of the valve, respectively. The pass-through interface may include an aperture for allowing regolith and other materials to pass through the seal. The pass-through interface may include a ring of soft material nested within an interface cutout in the valve seal holder. The pass-through interface may have an upper portion having the ring of soft material and a lower portion being an inward protrusion 520 of the valve seal holder to support the ring of soft material. The ring of soft material may be a compressible material configured to compress when force is applied to the soft material. For example, the ring of soft material may be configured to compress in response to force being applied between the soft material and a seat configured to interface with an external system having either a flow path or a pressurized chamber. The pass-through interface may create a seal configured to maintain a pressure difference between the ambient environment and the external system interfacing with the seat of a first valve portion. The pass-through interface may be rectangular, circular, or another shape.

The closed-off interface may be a barrier for preventing regolith and other materials passing through the debris-tolerant valve. The closed-off interface may include soft material nested within an interface cutout of the valve seal holder. The soft material may form a barrier with the soft material extending from one end of the interface cutout to the other end of the interface cutout. The closed-off interface may include a wall of soft material that stretches from one end of the interface cutout to the other end of the interface cutout. For the closed-off interface, the soft material may be a solid and stretch across the interface cutout. The soft material may be compressible and configured to interface with a seat of a first valve portion. The closed-off interface may create a pressure seal configured to maintain a pressure difference between the ambient environment and the external system interfacing with the seat of a first valve portion. The closed-off interface may be rectangular, circular, or another shape.

The valve seal holder may be situated between a first valve portion and a second valve portion. The first valve portion may include a seat configured to selectively couple with either the pass-through interface or the closed-off interface at the valve seal holder. The seat may be situated at an end of at least one of a flow path or a pressurized chamber of an external system. The second valve portion includes the camshaft configured to apply pressure against the first valve portion to separate the valve seal holder from the seat. The second valve portion also includes a rotation motor configured to rotate the valve seal holder The debris-tolerant valve overcomes the shortcomings of conventional valves by separating the rotation movements between valves and the sealing motion of the valves. That is, the separation of the valve seal holder from the seat and the rotation valve seal holder avoids the shearing forces commonly found in conventional valves. The separation of the valve seal holder and the rotation of the valve seal holder are independent movements from each other that provide a durable seal tolerant of abrasive debris. In one separate and independent movement, the camshaft separates either the pass-through interface or the closed-off interface of the valve seal holder from the seat. In another separate and independent movement, the rotation motor rotates the valve seal holder until at least one of the pass-through interface or the closed-off interface is aligned with the seat. Once aligned, another separate and independent movement of the camshaft may apply force to the first valve portion to compress the pass-through interface or the closed-off interface against the seat. Once compressed against the seat, the soft material of either the pass-through interface or the closed-off interface creates a seal over the seat for protection from debris. In some embodiments, the soft material of the closed-off interface pressed against the seat creates a pressure seal between the ambient environment and the flow path or pressurized chamber.

The independent and separate movements of the separation of the valve seal holder and the rotation of the valve seal holder may occur over different times. For example, separating either the pass-through interface or the closed-off interface from the seat occurs at a different time and is separately actuated from the rotation of the valve seal holder. In another example, rotating the valve seal holder occurs at a separate time and is separately actuated from the compressing of either the pass-through interface or the closed-off interface against the seat to create the seal. Described another way, three separate time durations can exist: 1) a time duration of separating either the pass-through interface or the closed-off interface from the seat; 2) a time duration for rotating the valve seal holder; and 3) a time duration for compressing either the pass-through interface or the closed-off interface against the seat to create the seal.

During the change of the valve state, the camshaft may be configured to suspend the valve seal holder away from the seat during rotation of the valve seal holder. Suspending the valve seal holder away from the seat during rotation means that the valve seal holder does not contact the seat during the rotation of the valve seal holder. In some embodiments, a spring-loaded system may suspend the valve seal holder away from the seat during rotation of the valve seal holder. When the spring-loaded system is not suspending the valve seal holder away from the seat, the camshaft may apply force to the valve seal holder to compress either the pass-through interface or the closed-off interface against the seat to create the seal. Separating the camshaft from the seat may require the camshaft to overcome the pressure that the spring-loaded system applies to the valve seal holder to hold the valve seal holder against the seat.

The debris-tolerant valve may be configured to overcome challenges presented by fine abrasive materials needed to flow through a system or present in a harsh environment. The debris-tolerant valve increases the likelihood that the seal will be maintained while fine abrasive particles are flowing through the debris-tolerant valve or the debris-tolerant valve is changing states in an environment with fine abrasive particles. Even if the fine abrasive materials stick to the seat, soft material, or other moving parts of the debris-tolerant valve may be resistant to degradation due to 1) the soft material's large surface area relative to the seat and the ability to form around the particles to allow the seal to form and 2) the separate, independent motions of the separating of the valve seal holder and the rotating of the valve seal holder.

The debris-tolerant valve provides a non-stop, minimal downtime apparatus designed to maximize the deoxidation process of regolith. The system and apparatus embodiments described herein provide minimal production downtime compared to conventional production systems performing carbothermal reduction. The minimal downtime of the debris-tolerant valve is due to the independent movements of the separating of the valve seal holder, the rotating of the valve seal holder, and the compression of either the pass-through interface or the closed-off interface of the valve seal holder to create a seal at a seat that is an interface for a flow path or a pressurized chamber. The debris-tolerant valve may be situated between a hard backdrop and a pressurized volume Referring to FIG. 1, illustrated is an example of a carbothermal reduction system 100 configured to reduce metallic oxides from regolith using a concentrated light source 130. The carbothermal reduction system 100 includes an inlet valve assembly 110, a concentrated light source 130, a moving platform 140, a heat shield 150, a slag removal assembly 160, and an outlet valve assembly 170. The inlet valve assembly 110, the moving platform 140, and the outlet valve assembly 170 may all include a debris-tolerant valve used for processing regolith for carbo-thermal reduction. Carbothermal reduction systems are a type of technology used to convert metal oxides into metals through the application of heat. The conversion process releases carbon monoxide that may be later converted to oxygen. Unlike conventional systems, the carbothermal reduction systems that utilize the debris-tolerant valve described herein are efficient and well-suited for mass-producing carbon monoxide and, subsequently, oxygen by using a moving platform 140 positioned underneath a concentrated light source 130.

At the inlet valve assembly 110, regolith can be received. The regolith can include oxidized metals. For example, oxidized metals can comprise more than 90% of lunar regolith by weight. The lunar regolith can be received at the inlet valve assembly 110. The inlet valve assembly 110 may be communicatively coupled to a controller. The controller can selectively actuate the inlet valve assembly 110 to control the flow of regolith into the carbothermal reduction system 100. The inlet valve assembly 110 may include a hopper 112 coupled to the intake side. The hopper 112 may have a top opening wider than the opening flowing to the inlet valve assembly 110. The hopper 112 may taper from the top side to the bottom side to make the regolith easier to load into the carbothermal reduction system 100 while simultaneously funneling the regolith to the inlet valve assembly 110. The inlet valve assembly 110 may include the debris-tolerant valve. The debris-tolerant valve may be in an open state to allow regolith material to pass through or in a closed state to prevent regolith material from passing through. In some embodiments, the debris-tolerant valve may include a feedback mechanism for determining whether to be in an open state or a closed state depending on the amount of regolith in a first silo 114. The inlet valve assembly 110 may be coupled to the first silo 114 beneath the inlet valve assembly 110. The inlet valve assembly 110 may be situated above a moving platform 140 of the carbothermal reduction system 100. The inlet valve assembly 110 may allow gravity to perform the work of moving regolith from the hopper 112 through the inlet valve assembly 110 to the first silo 114.

The concentrated light source 130 may be positioned above the moving platform 140 and configured to focus light energy along a line of focus toward the moving platform 140. The concentrated light source 130 may include a plurality of lasers or a plurality of concentrated solar light inlets. The plurality of lasers or concentrated solar light inlets may be configured to perform heat treatments on the reactants mixtures suspended on the moving platform 140. The concentrated solar light inlet may channel a solar light source. Each of the concentrated light sources 130 may be configured to focus light energy along a line of focus toward the moving platform 140. Each of the concentrated light sources 130 may be communicatively coupled to a controller configured to control the intensity of light within the line of focus directed toward the moving platform 140.

The moving platform 140 may be situated below the inlet valve assembly 110 and the concentrated light source 130. The moving platform 140 may be configured to face the concentrated light source 130 and configured to suspend a reactants mixture during movement of the moving platform 140. The moving platform 140 may be configured to cycle repeatedly through a plurality of stations of the carbothermal reduction system 100. Each station of the plurality of stations may be configured to perform processing steps related to carbothermal reduction. In some embodiments, the moving platform 140 may be divided into a plurality of sections where each section is configured to suspend a batch of reactants mixture. The concentrated light source 130 may be configured to perform a heat treatment on the batch of reactants mixtures suspended by a section of the plurality of sections of the moving platform 140. The moving platform may include a rotating regolith processing valve configured to rotate to the different stations of the carbothermal reduction system. The reactants mixture may be a reactant or a plurality of reactants.

The slag removal assembly 160 may be configured to remove slag on the moving platform 140 created by the heat treatments from the concentrated light sources 130. The slag forms on the moving platform 140 after the deoxidation process of the reactants mixture is complete. Since excess slag interferes with the deoxidation of reactants mixture further added to the moving platform 140, the slag removal assembly 160 removes the excess slag before more reactants material is added to the moving platform 140. The reactants mixture may be a reactant or a plurality of reactants.

The carbothermal reduction system 100 further includes an outlet valve assembly 170 configured to control the flow of depleted regolith (e.g., slag) exiting the reactor. The outlet valve assembly may include a debris-tolerant valve for handling the carbon monoxide generated by carbothermal reduction system. In some embodiments, the external system configured to interface with the seat of the debris-tolerant valve is the carbothermal reduction system. The carbothermal reduction system may include a pressurized chamber configured to change in pressure applied in response to creating the seal between the seat and the at least one of the pass-through interface or the closed-off interface of the debris-tolerant valve.

Figure 2:
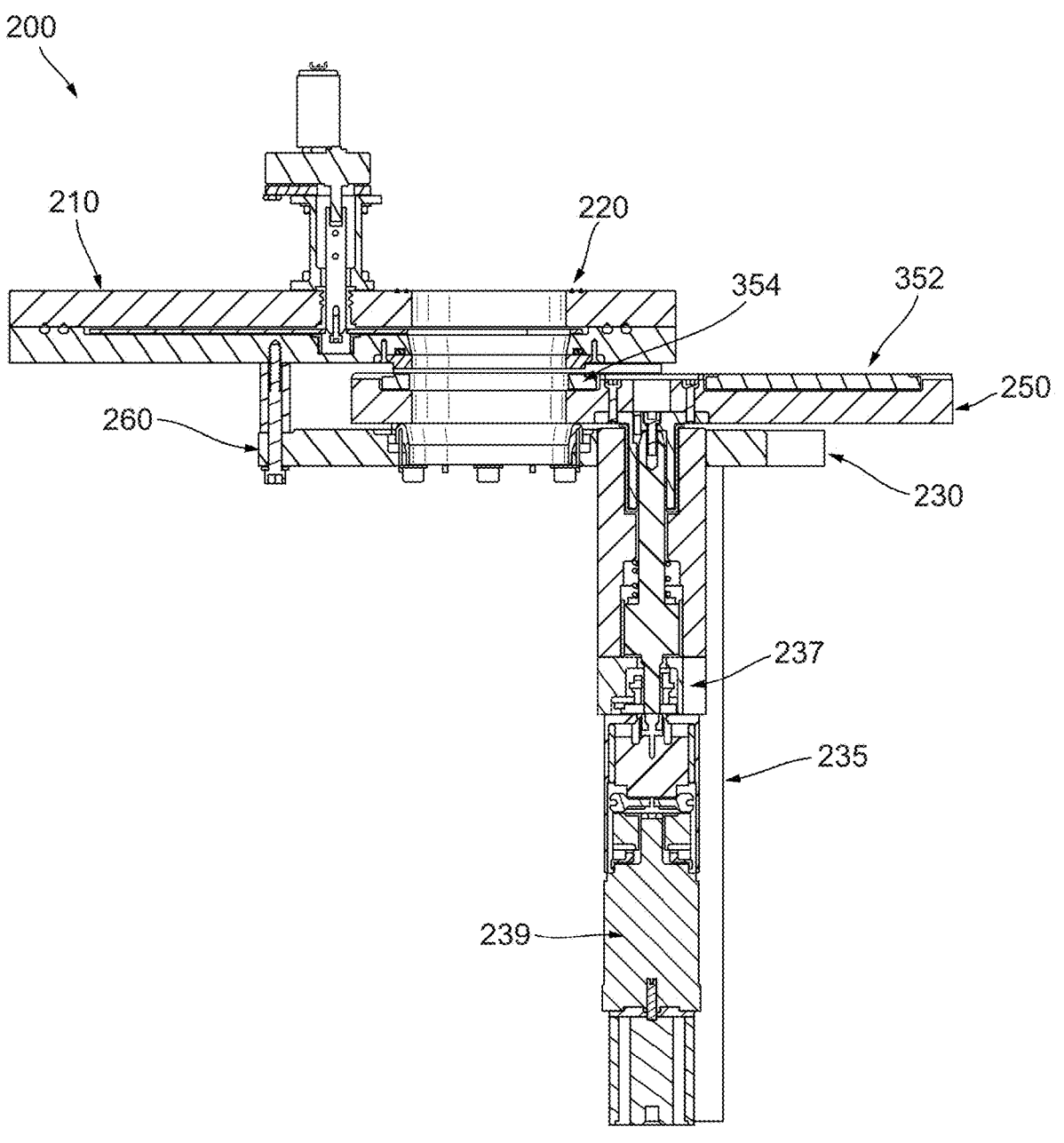
FIG. 2 depicts a cross-section of an example of a debris-tolerant valve having a first valve portion with a seat and a second valve portion with a valve seal holder having a pass-through interface and a closed-off interface configured to open and close the valve and form a seal with the seat.

FIG. 2 depicts a cross-section of an example of a debris-tolerant valve having a first valve portion 210 with a seat 220 and a second valve portion 230 with a valve seal holder 250 having a pass-through interface 352 and a closed-off interface 354 configured to open and close the valve and form a seal with the seat 220. The debris-tolerant valve may be configured to pass fine abrasive particles through the valve connecting two flow paths together. The debris-tolerant valve may be configured to create a seal against a seat 220 to maintain pressure in a pressurized chamber or to prevent the flow of fine abrasive particles. The debris-tolerant valve may be situated at an intake valve assembly of a carbothermal reduction system 100 or an outlet valve assembly of a carbothermal reduction system 100. The seat 220 may include a static O-ring seal. The first valve portion 210 may be used to start and stop the slag from falling onto the sealing seats. This second valve portion may be pressure sealing.

The debris-tolerant valve is configured to alternate between a pass-through interface 352 and a closed-off interface 354. The pass-through interface 352 and the closed-off interface 354 may correspond to an open state and a closed state, respectively. The pass-through interface 352 may allow flow through the debris-tolerant valve and the closed-off interface 354 may block flow through the debris-tolerant valve. The pass-through interface 352 and the closed-off interface 354 may be situated at a valve seal holder 250. The valve seal holder 250 is configured to rotate for selection between the pass-through interface 352 and the closed-off interface 354. The valve seal holder 250 may be configured to rotate about a center axis in the center of the valve seal holder 250. The valve seal holder 250 may be configured to rotate in either a clockwise direction or a counter-clockwise direction to align the pass-through interface 352 or the closed-off interface 354. The valve seal holder 250 may include two sides with a first side having the pass-through interface 352 and the closed-off interface 354. The valve seal holder 250 may be configured to rotate or move without brushing against any other component of the debris-tolerant valve. In some embodiments, the valve seal holder 250 may be configured to slide in either a first direction or a second direction for selection between the pass-through interface 352 and the closed-off interface 354. The valve seal holder 250 may slide to align either the pass-through interface 352 or the closed-off interface 354 with the seat 220. In some embodiments, the valve seal holder 250 may include a brush for wiping the sealing interface, including the seat 220.

The valve seal holder 250 may be situated between a first valve portion 210 and a second valve portion 230. The valve seal holder 250 may be configured to spin between the first valve portion 210 and the second valve portion 230 without brushing against the first valve portion 210 or the second valve portion 230. The first valve portion 210 may include a seat 220 that is selectively coupled to a pressurized volume or a flow path. The first valve portion 210 may be configured to be selectively coupled with either the pass-through interface 352 or the closed-off interface 354. The pass-through interface 352 or the closed-off interface 354 may be compressed against the seat 220 of the first valve portion 210 or the second valve portion 230. While rotating, the valve seal holder 250 does not brush against the seat 220 or the first valve portion 210. The first valve portion 210 may be coupled to the second valve portion 230 with a fastener 260. The distance between the first valve portion 210 and the second valve portion 230 may be greater than the thickness of the valve seal holder 250.

The second valve portion 230 may be coupled to the first valve portion 210 with the fastener 260. The second valve portion 230 may include a camshaft 235 that is configured to connect to the valve seal holder 250 at a center axis. The camshaft 235 may be configured to separate the valve seal holder 250 from the seat 220 of the first valve portion 210. The camshaft 235 may be configured to rotate the valve seal holder 250 between the pass-through interface 352 and the closed off-interface. The camshaft 235 may be coupled to an aperture in the center of the valve seal holder 250. The camshaft 235 may include a camshaft motor 239 configured to apply pressure to the valve seal holder 250 for compression against the seat 220 of the first valve portion 210. In some embodiments, the camshaft 235 may be configured to overcome the force of a spring-loaded system 310 that pushes the valve seal holder 250 away from the seat 220 of the first valve portion 210. The spring-loaded system 310 may separate the valve seal holder 250 from the first valve portion 210. The camshaft 235 may include a rotation motor 237 that is configured to rotate the valve seal holder 250 between the pass-through interface 352 and the closed-off interface 354. In some embodiments, the rotation motor 237 may be enabled only in response to the separating of the valve seal holder 250 from the seat 220 of the first valve section. The rotation motor 237 may be configured to drive the valve seal holder 250 in either a clockwise direction or a counter-clockwise direction via the aperture located at the center of the valve seal holder 250. The external system having a pressurized chamber may have a change in pressure applied in response to creating the seal between the seat 220 and either the pass-through interface 352 or the closed-off interface 354 using the camshaft 235. In some embodiments, the camshaft may use a linear actuation method. In some embodiments, the camshaft may be replaced by a linear actuation mechanism.

Figure 3:
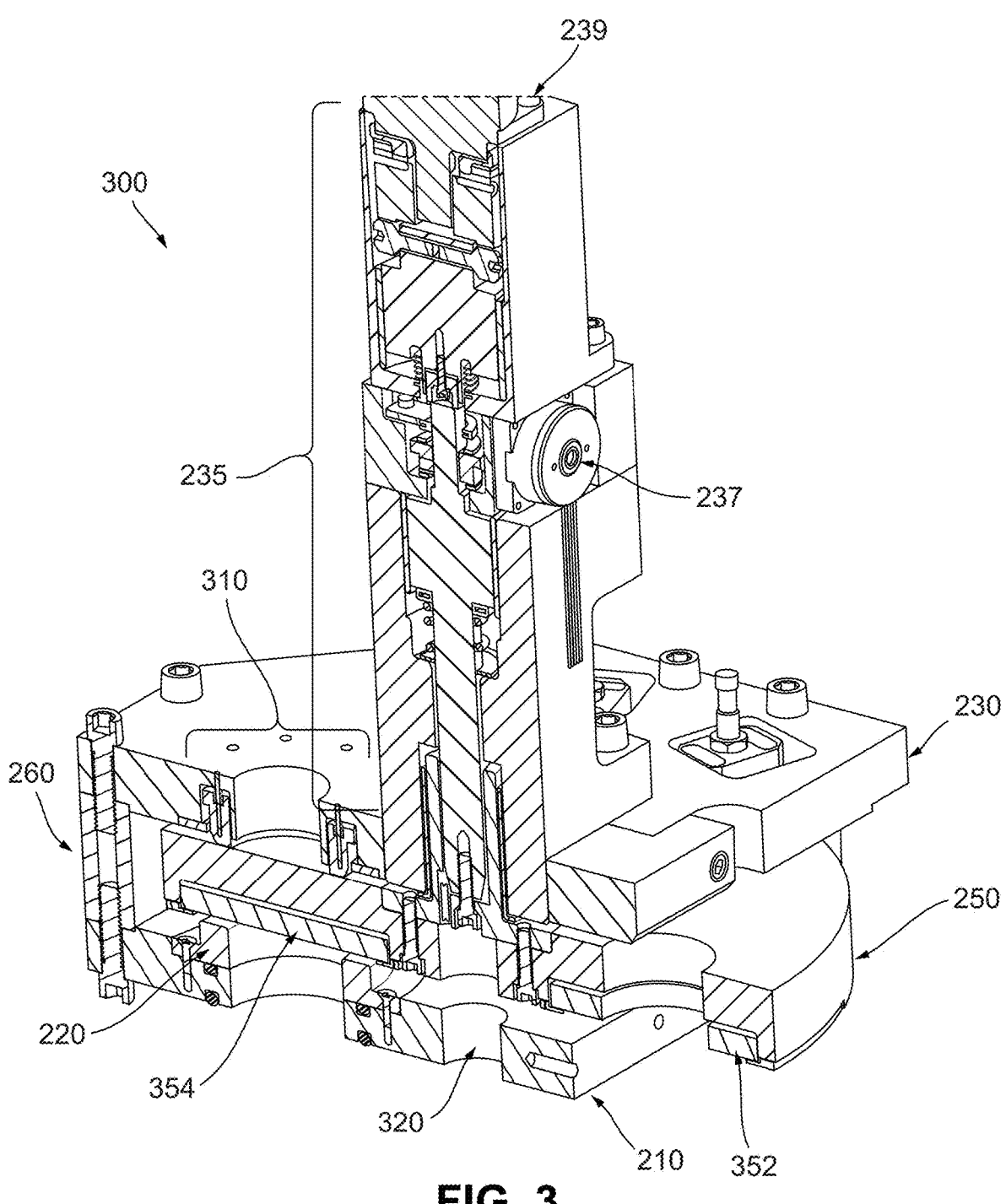
FIG. 3 depicts another cross-section of an example of a debris-tolerant valve having a first valve portion with a seat and a second valve portion with a valve seal holder having a pass-through interface and a closed-off interface configured to open and close the valve and form a seal with the seat.

FIG. 3 depicts an angled cross-section of an example of a debris-tolerant valve having a first valve portion 210 with a seat 220 and a second valve portion 230 with a valve seat holder 250 having a pass-through interface 352 and a closed-off interface 354 configured to open and close the valve and form a seal with the seat 220. The debris-tolerant valve may be oriented in any direction in which the first valve portion 210 is a bottom portion and the second valve portion 230 is a top portion of the debris-tolerant valve. The debris-tolerant valve may include a first valve portion 210 and a second valve portion 230 for covering the valve seal holder 250. Covering the valve seal holder 250 protects the valve seal holder 250 from outside exposure and debris while also containing any debris that may be passed through the debris-tolerant valve. The debris-tolerant valve may include a valve seal holder 250 between the first valve portion 210 and the second valve portion 230. The first valve portion 210 and the second valve portion 230 may have the surface area to cover both sides of the valve seal holder 250 to prevent exposing the valve seal holder 250 to outside debris.

The first valve portion 210 may include a seat 220 configured to interface with an external system having either a flow path or a pressurized chamber. The seat 220 may be circular and include an opening to allow fine particles to pass through the seat 220. The seat 220 may include a lip that protrudes beyond a surface of an edge of the first valve portion 210. The lip of the seat 220 may extend around the circumference or perimeter of the seat 220 such that the lip forms a ring at the seat 220. In some embodiments, the lip of the seat 220 may protrude out at least 5 mm in order to form a seal with either the pass-through interface 352 or the closed-off interface 354 of the valve seal holder 250. In some embodiments, the lip of the seat 220 may extend out 1 mm, 5 mm, 10 mm, or 50 mm. The seat 220 may be configured to not compress in response to applying force to the valve seal holder 250 and the seat 220 may be metallic The second valve portion 230 may include a camshaft 235 that is configured to couple to an aperture of valve seal holder 250. The camshaft 235 may be offset from the seat 220. For example, the camshaft 235 may be offset by a predetermined distance such that the pass-through interface 352 or the closed-off interface 354 is configured to be aligned with the seat 220. In some embodiments, the width or diameter of the valve seal holder 250 is smaller than the distance between the camshaft 235 and the fastener 260 coupling the first valve portion 210 and the second valve portion 230. The camshaft 235 may include a camshaft motor 239 that may be configured to force the valve seal holder 250 against the seat 220 of the first valve portion 210. In some embodiments, the camshaft motor 239 may apply force to the valve seat holder 250 to compress either the pass-through interface 352 or the closed-off interface 354 against the seat 220. In some embodiments, the camshaft motor 239 may overcome the force of the spring-loaded system 310, which is configured to push the valve seal holder 250 away from the seat 220. The spring-loaded system 310 may separate the valve seal holder 250 from the seat 220 of the first valve portion 210 by pushing the valve seal holder 250 away from the seat 220. The second valve portion 230 may include the spring-loaded system 310. The spring-loaded system 310 may be aligned with the seat 220 of the first valve portion 210 and either the pass-through interface 352 or the closed-off interface 354 of the valve seal holder 250. In one example, the spring-loaded system 310 may apply force at points aligned with the lip of the seat 220 to separate the valve seal holder 250 from the seat 220. In another example, the spring-loaded system 310 may apply force around a cutout at the second valve portion 230 through which debris may flow through the second valve portion 230. The cutout of the second valve portion 230 may be aligned with the seat 220 of the first valve portion 210.

The valve seal holder 250 may include a plurality of stations. Each of the stations may correspond to a pass-through interface 352, a closed-off interface 354, or a dust cap. The rotation motor 237 of the camshaft 235 may be configured to rotate the valve seal holder 250 at a center to align the plurality of stations with the seat 220 of the first valve portion 210. For example, the rotation motor 237 can align either the pass-through interface 352 or the closed-off interface 354 with the seat 220 of the first valve portion 210. The valve seal holder 250 may be configured to rotate when the valve seal holder 250 is separated from the seat 220 of the first valve portion 210. The valve seal holder 250 may be configured to rotate once a distance threshold is satisfied, the distance threshold corresponding to a distance between a first side of the valve seal holder 250 having the plurality of stations and the seat 220 of the first valve portion 210. In some embodiments, the distance threshold corresponds to the distance between the first side of the valve seal holder 250 having the plurality of stations and the seat 220 of the first valve portion 210. The first side of the valve seal holder 250 does not brush against the first valve portion 210 during rotation.

The debris-tolerant valve may include sensors for determining the position and the station that is aligned with the seat 220 of the first valve portion 210. The debris-tolerant valve may include induction sensors at either the first portion or the second portion configured to detect the rotation of the valve seal holder 250 and/or the distance of the valve seal holder 250 from the seat 220 of the first valve portion 210. The induction sensors may use reference points to determine the distance or rotation of the valve seal holder 250. In some embodiments, the rotation motor 237 may be a servo that is configured to provide a rotation angle or radians from a reference point. In some embodiments, the camshaft motor 239 is a servo that is configured to provide a force reading to be compared to the force reading of the spring-loaded system 310.

Figure 4:
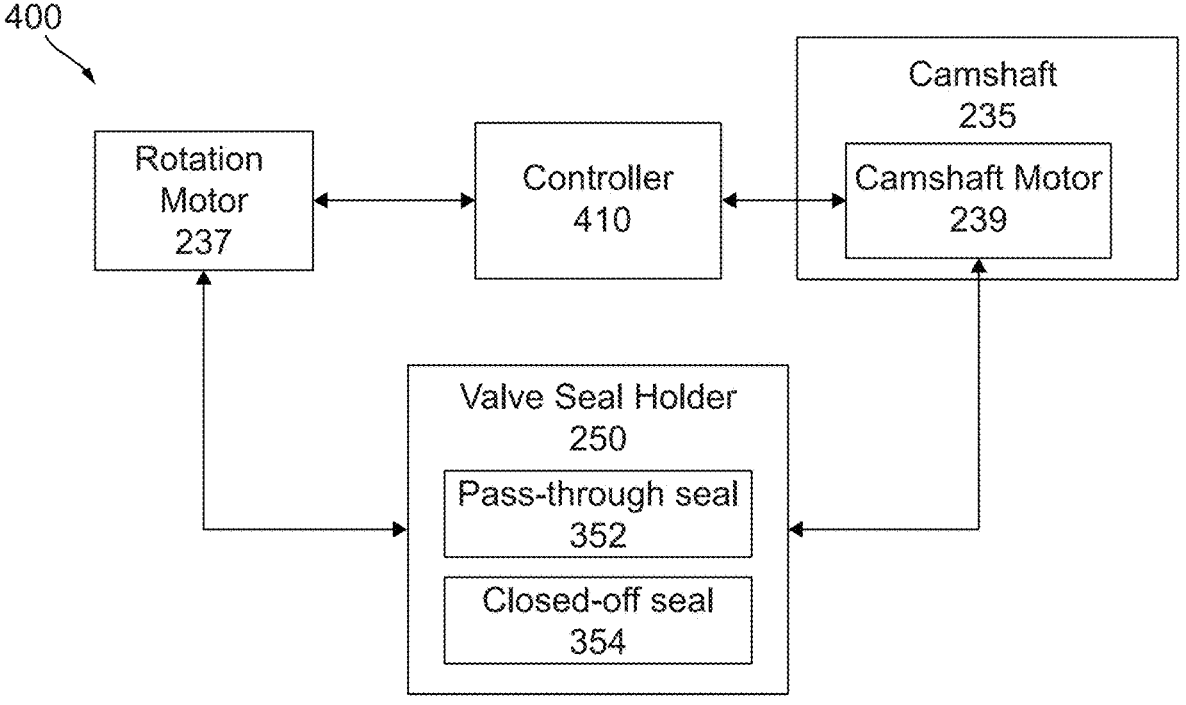
FIG. 4 depicts an example of a block diagram illustrating a controller communicatively coupled to a rotation motor configured to rotate a valve seal holder and a camshaft configured to lift a valve seal holder from a seat configured to interface with an external system having either a flow path or a pressurized chamber.

FIG. 4 depicts an example of a block diagram illustrating a controller 410 communicatively coupled to a rotation motor 237 configured to rotate a valve seal holder 250 and a camshaft 235 configured to lift a valve seal holder 250 from a seat 220 configured to interface with an external system having either a flow path or a pressurized chamber. The controller 410 may be configured to operate the valve seal holder 250 to switch between an open state and a closed state. The controller 410 may perform separate, independent actions to prevent the valve seal holder 250 from contacting the seat 220 or the first valve portion 210 during rotation. The controller 410 may be configured to operate the rotation motor 237 that is configured to rotate the valve seal holder 250. The controller 410 may be configured to operate the camshaft 235 that is coupled to the valve seal holder 250 where the camshaft 235 may be configured to selectively separate the least one of the pass-through interface 352 and the closed-off interface 354 from the seat 220 of the top valve portion.

The controller 410 may be configured to separate, using the camshaft 235, the pass-through interface 352 or the closed-off interface 354 of the valve seal holder 250 from the seat 220 configured to interface with the external system having either a flow path or a pressurized chamber. The controller 410 may be configured to rotate, using the rotation motor 237, the valve seal holder 250 until at least one of the pass-through interface 352 or the closed-off interface 354 is aligned with the seat 220 configured to interface with an external system having either a flow path or a pressurized chamber. The controller 410 may be configured to compress, in response to the at least one of the pass-through interface 352 or the closed-off interface 354 being aligned with the seat 220, the at least one of the pass-through interface 352 or the closed-off interface 354 against the seat 220 to create a seal over the seat 220 for protection from debris. In some embodiments, the soft material of the closed-off interface pressed against the seat creates a seal between the ambient environment and either the flow path or the pressurized chamber.

Separating the pass-through interface 352 and the closed-off interface 354 from the seat 220 occurs at a different time and is separately actuated from rotating the valve seal holder 250. Rotating the valve seal holder 250 occurs at a separate time and is separately actuated from the compressing of the pass-through interface 352 or the closed-off interface 354 against the seat 220 to create the seal over the seat 220 for protection from debris. In some embodiments, separating the pass-through interface 352 and the closed-off interface 354 occurs over a first time duration, rotating the valve seal holder 250 occurs during a second time duration, and compressing either the pass-through interface 352 or the closed-off interface 354 against the seat 220 to create the seal occurs during a third time duration. The controller 410 may perform these operations such that first time duration, the second time duration, and the third time duration do not overlap.

The controller 410 may perform multiple operations while separating the valve seal holder 250 (or the pass-through interface 352 or closed off interface) from the seat 220 using the camshaft 235. The controller 410 may be configured to instruct the camshaft 235 to apply force in a direction perpendicular to a surface of the at least one of the pass-through interface 352 or the closed-off interface 354 that can contact the seat 220 using the camshaft 235. Either the pass-through interface 352 or the closed-off interface 354 may be decompressed in response to separating the pass-through interface 352 and the closed-off interface 354 from the seat 220. The flow path or the pressurized chamber of the external system may be exposed to an ambient environment in response to separating either the pass-through interface 352 and the closed-off interface 354 from the seat 220. In some embodiments, compressing at least one of the pass-through interfaces 352 or the closed-off interface 354 against the seat 220 to create the seal includes applying force to the valve seal holder 250 in a direction perpendicular to the surface of the at least one of the pass-through interface 352 or the closed-off interface 354 that contacts the seat 220 by the camshaft 235.

In some embodiments, the debris-tolerant valve includes a spring-loaded system 310 at the second valve portion 230. The spring-loaded system 310 may be configured to suspend the valve seal holder 250 away from the seat 220 during rotation of the valve seal holder 250. The camshaft 235 may apply force to the valve seal holder 250 to compress either the pass-through interface 352 or the closed-off interface 354 against the seat 220 to create the seal. The seal may be protect the seat 220 from debris and, in cases where a closed-off interface is used, create a pressure barrier between the ambient environment and the seat 220 that interfaces with either the flow path or the pressurized chamber. Separating the pass-through interface 352 and the closed-off interface 354 from the seat 220 further includes interrupting the force applied by the camshaft 235 and separating the valve seal holder 250 from the seat 220 using the spring-loaded system 310. Additionally, compressing at least one of the pass-through interface 352 or the closed-off interface 354 against the seat 220 to create the seal further includes actuating the camshaft 235 to apply force to the valve seal holder 250 in a direction perpendicular to a surface of the at least one of the pass-through interface or the closed-off interface, the force applied by the camshaft being greater than the force applied by the spring-loaded system 310 to separate the valve seal holder 250 from the seat 220.

Figure 5A:
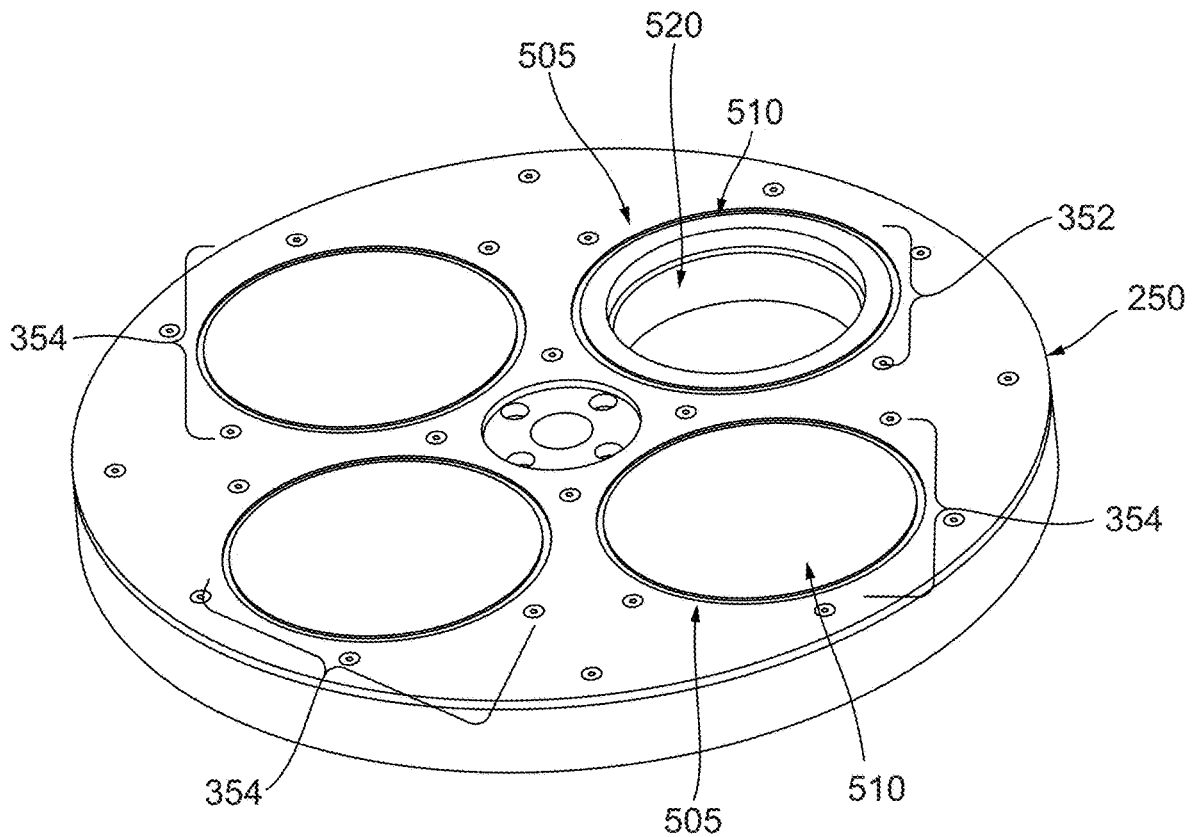
FIG. 5A depicts an example of a valve seal holder with a plurality of stations where each station includes either a pass-through valve or a closed-off valve.

FIG. 5A depicts an example of a valve seal holder 250 with a plurality of stations where each station includes either a pass-through valve or a closed-off valve. The valve seal holder 250 may be shaped as a disc, a rotary, a bar, and/or the like. The valve seal holder 250 may include a center aperture configured to couple to a rotation motor 237 and a camshaft 235. The rotation motor 237 may be configured to rotate the valve seal holder 250 via a coupling at the center aperture. The camshaft 235 is configured to apply force to the valve seal holder 250 to separate the valve seal holder 250 from the seat 220 or compress the valve seal holder 250 to the seat 220.

The plurality of stations may be arranged around the circumference or edge of the valve seal holder 250. Each of the stations may include a pass-through interface 352 or a closed-off interface 354 for selectively coupling to the seat 220. When the pass-through interface 352 is selectively coupled to the seat 220, the debris-tolerant valve is in an open state to allow flow through the valve. When the closed-off interface 354 is selectively coupled to the seat 220, the debris-tolerant valve is in a closed-off state to block flow through the valve. In some embodiments, the valve seal holder 250 may include the pass-through interface 352 or the closed-off interface 354 in a line and the valve seal holder 250 is configured to be linearly actuated. The plurality of stations may include a cleaning station configured to remove particles from the seat 220. The cleaning station may be a dust cap or the like that cleans the surfaces of the seat 220 of particles and debris. The cleaning station may also include a blower, a brush, a washer, a sponge, and/or the like.

The plurality of stations may include an interface cutout 505 in the valve seal holder 250 and a soft material 510 inserted into the interface cutout 505. The soft material 510 may be in the shape of a ring that follows the edge or the circumference of the interface cutout 505. In some embodiments, the interface cutout 505 and the ring of soft material 510 may be wider than the seat 220 at the first valve portion 210. The additional width of the ring of soft material 510 can increase the likelihood that a seal is created and decrease the need for a precise alignment between the ring of soft material 510 and the seat 220. In some embodiments, only a portion of the ring of soft material 510 is compressed in response to compressing the valve seal holder 250 against the seat 220. In some embodiments, the pass-through interface 352 and the closed-off interface 354 may include the ring of soft material 510. In some embodiments, the pass-through interface 352, the closed-off interface 354, and the seat 220 are circular.

FIG. 5B depicts an example of a closed-off interface 354 configured to be situated at a station of the valve seal holder 250. The closed-off interface 354 may be a barrier for preventing regolith and other materials passing through the seal. The closed-off interface 354 may include soft material 510 nested within an interface cutout 505 of the valve seal holder 250. The soft material 510 may form a barrier with the soft material 510 extending from one end of the interface cutout 505 to the other end of the interface cutout 505. The closed-off interface 354 may include a wall of soft material 510 that stretches from one end of the interface cutout 505 to the other end of the interface cutout 505. For the closed-off interface 354, the soft material 510 may be a solid and stretch across the interface cutout 505. The soft material 510 may be compressible and configured to interface with a seat 220 of a first valve portion 210. The closed-off interface 354 may create a seal configured to maintain a pressure difference between the ambient environment and the external system interfacing with the seat 220 of a first valve portion 210. The closed-off interface 354 may be rectangular, circular, or another shape.

FIG. 5C depicts an example of a pass-through interface 352 configured to be situated at a station of the valve seal holder 250. The pass-through interface 352 and the closed-off interface 354 may correspond to an open state of the valve and a closed state of the valve, respectively. The pass-through interface 352 may include an aperture for allowing regolith and other materials to pass through the seal. The pass-through interface 352 may include a ring of soft material 510 nested within an interface cutout 505 in the valve seal holder 250. The pass-through interface 352 may have an upper portion having the ring of soft material 510 and a lower portion being an inward protrusion 520 of the valve seal holder 250 to support the ring of soft material 510. The ring of soft material 510 may be a compressible material configured to compress when force is applied to the soft material 510. For example, the ring of soft material 510 may be configured to compress in response to force being applied between the soft material 510 and a seat 220 configured to interface with an external system having either a flow path or a pressurized chamber. The pass-through interface 352 may be rectangular, circular, or another shape.

Figure 6:
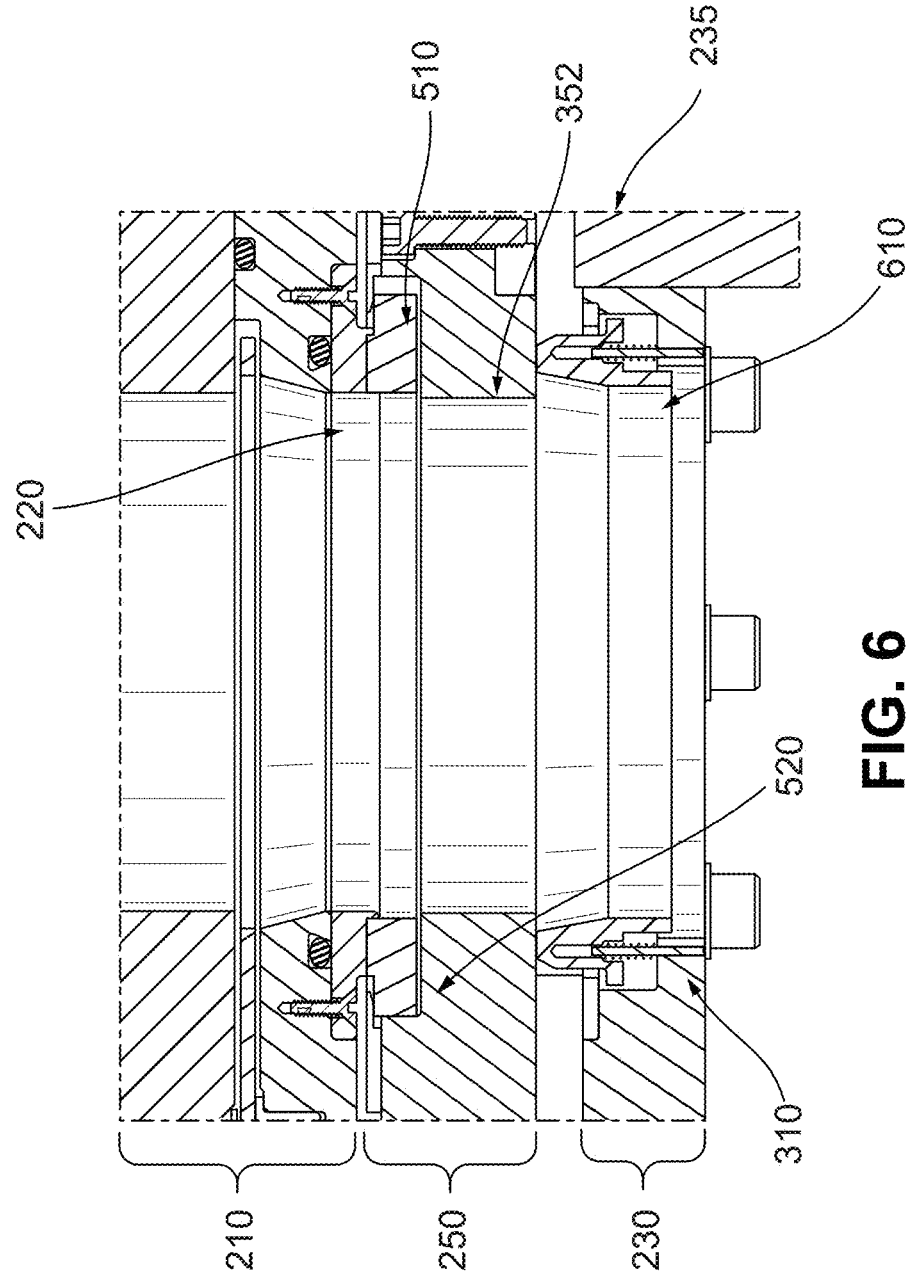
FIG. 6 depicts an example of a valve in an open state having the pass-through interface compressed against the seat, the seat being configured to interface with an external system having a flow path or a pressurized chamber.

FIG. 6 depicts a cross-section of an example of a valve in an open state having the pass-through interface 352 compressed against the seat 220 configured to interface with an external system having a flow path or a pressurized chamber. The pass-through interface 352 may be configured to be compressed against the seat 220 of the top valve portion. The pass-through interface 352 may be configured to be aligned with the seat 220 of the top valve portion such that the aperture in the pass-through interface 352 is aligned with the opening at the seat 220 that is configured to interface with an external system that has a flow path or a pressurized chamber. The spring-loaded system 310 may separate the pass-through interface 352 from the seat 220. Additionally, and/or alternatively, the camshaft 235 may compress the pass-through interface 352 against the seat 220.

In some embodiments, the ring of soft material 510 may be configured to be compressed against the seat 220 configured to interface with the external system. The ring of soft material 510 may be supported by an inward protrusion 520 of the valve seal holder 250. In some embodiments, only an inner portion of the ring of soft material 510 is configured to compress. The outer portion of the ring of soft material 510 may not be compressed while the pass-through interface 352 is compressed against the seat 220.

The second valve portion 230 may include a cutout that is configured to interface with the pass-through interface 352. The cutout of the second valve portion 230 may receive the material flowing through the pass-through interface 352. In some embodiments, the second valve portion 230 includes a hard wall 610 instead of the cutout configured to interface with the pass-through interface 352.

Figure 7:
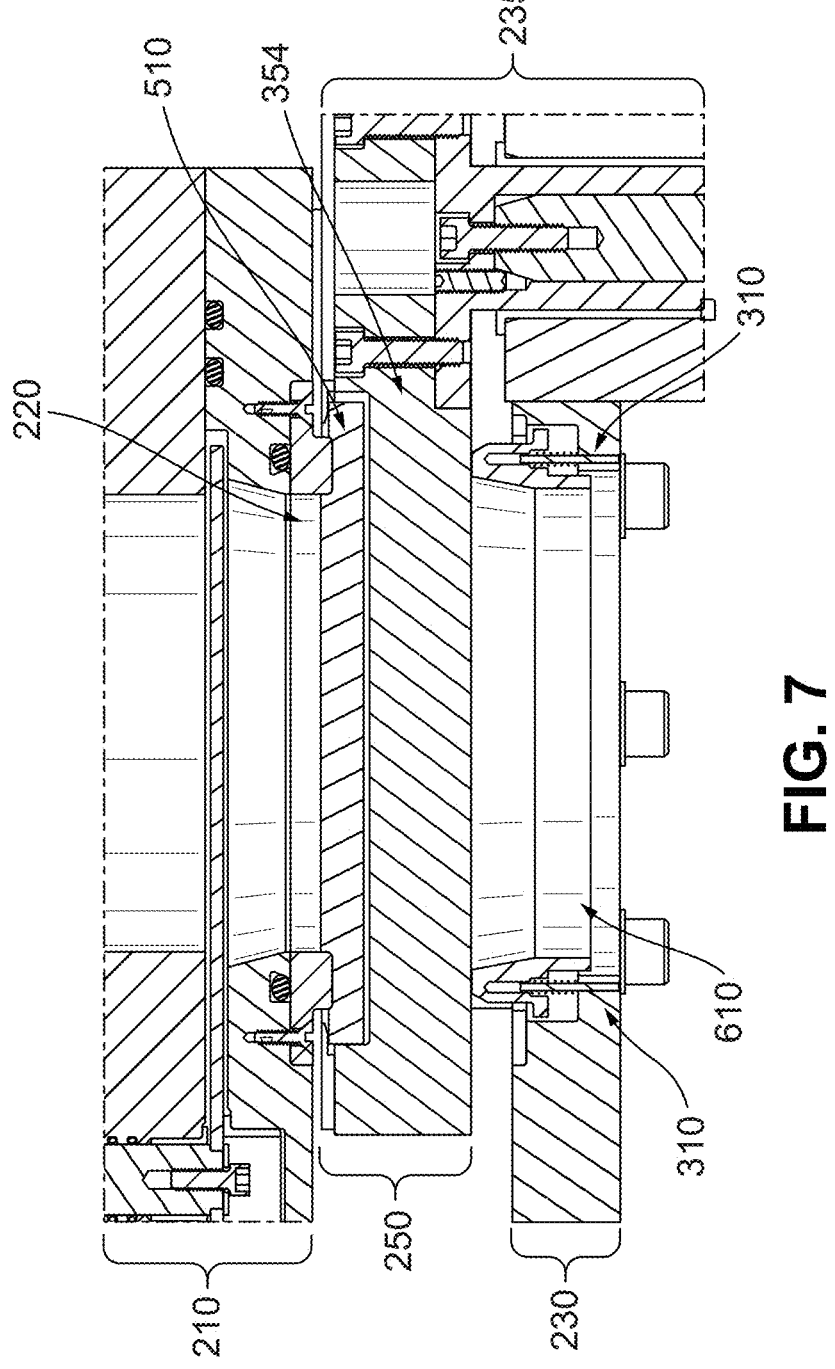
FIG. 7 depicts an example of a valve in a closed state having the closed-off interface compressed against the seat, the seat being configured to interface with an external system having a flow path or a pressurized chamber.

FIG. 7 depicts an example of a valve in a closed state having the closed-off interface 354 compressed against the seat 220, the seat 220 being configured to interface with an external system having a flow path or a pressurized chamber. The closed-off interface 354 may be configured to be compressed against the seat 220 of the first valve portion 210. The closed-off interface 354 may be configured to be aligned with the seat 220 of the first valve portion 210 such that the barrier in the closed-off interface 354 is aligned with the opening at the seat 220 that is configured to interface with an external system that has a flow path or a pressurized chamber. The spring-loaded system 310 may separate the closed-off interface 354 from the seat 220. Additionally, and/or alternatively, the camshaft 235 may compress the closed-off interface 354 against the seat 220.

In some embodiments, the soft material 510 may be configured to be compressed against the seat 220 configured to interface with the external system. The soft material 510 may extend across the cutout of the valve seal holder 250. In some embodiments, only an inner portion of the soft material 510 is configured to compress. The outer portion of soft material 510 may not be compressed while the pass-through interface 352 is compressed against the seat 220. The second valve portion 230 may include a hard wall 610 that is configured to interface with the pass-through interface 352.

Figure 8:
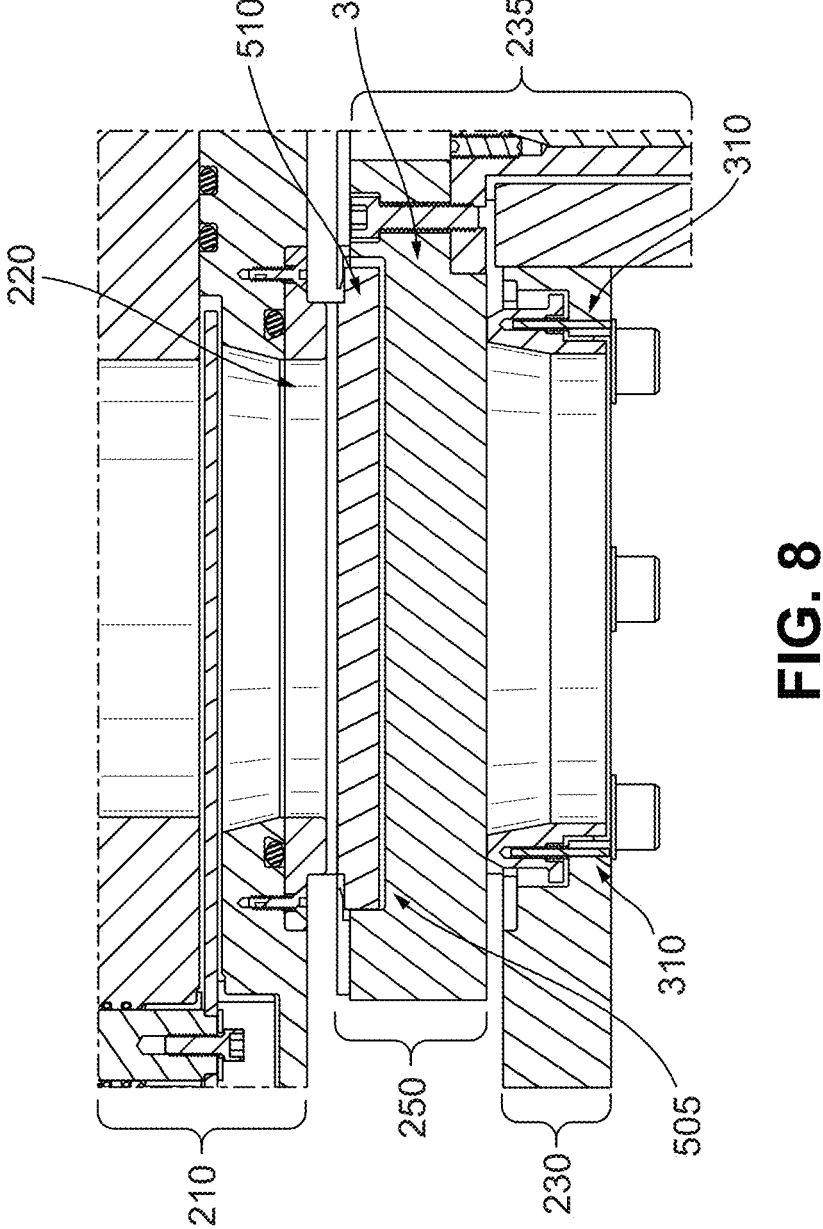
FIG. 8 depicts an example of a valve in a closed state having the closed-off interface separated from the seat, the seat being configured to interface with an external system having a flow path or a pressurized chamber.

FIG. 8 depicts an example of a valve in a closed state having the closed-off interface 354 separated from the seat 220, the seat 220 being configured to interface with an external system having a flow path or a pressurized chamber. The closed-off interface 354 being separated from the seat 220 may mean the valve seal holder 250 is ready to be rotated. For example, the closed-off interface 354 may have been previously compressed against the seat 220 to create a seal. After separating the closed-off interface 354 from the seat 220, the valve seal holder 250 may be rotated to align the pass-through interface 352 with the seat 220. In some embodiments, the pass-through interface 352 may be separated from the seat 220 to align the closed-off interface 354 with the seat 220. While the closed-off interface 354 is separated from the seat 220 and in the uncompressed state, the external system may be exposed to an ambient pressure. In the uncompressed state, the soft material 510 of the closed-off interface 354 does not contact the seat 220 configured to interface with the external system.

Figure 9:
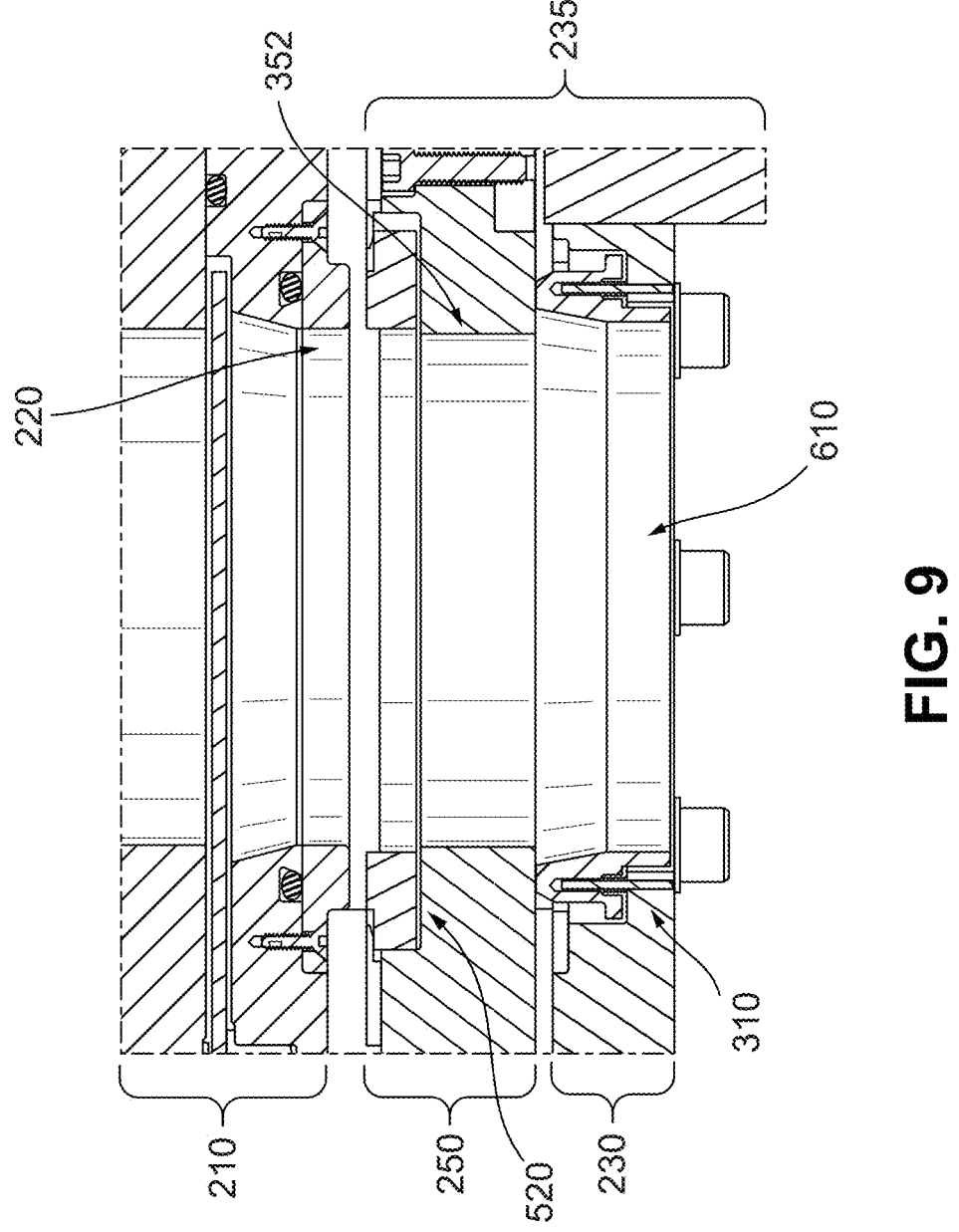
FIG. 9 depicts an example of a valve in an open state having the pass-through interface separated from the seat, the seat being configured to interface with an external system having a flow path or a pressurized chamber.

FIG. 9 depicts an example of a valve in an open state having the pass-through interface 352 separated from the seat 220, the seat 220 being configured to interface with an external system having a flow path or a pressurized chamber. The pass-through interface 352 being separated from the seat 220 may mean the valve seal holder 250 is ready to be rotated. For example, the pass-through interface 352 may have been previously compressed against the seat 220 to create a seal. After separating the pass-through interface 352 from the seat 220, the valve seal holder 250 may be rotated to align the closed-off interface 354 with the seat 220. In some embodiments, the closed-off interface 354 may be separated from the seat 220 to align the pass-through interface 352 with the seat 220. While the pass-through interface 352 is separated from the seat 220 and in the uncompressed state, the external system may be exposed to an ambient pressure. In the uncompressed state, the soft material 510 of the pass-through interface 352 does not contact the seat 220 configured to interface with the external system.

Figure 10:
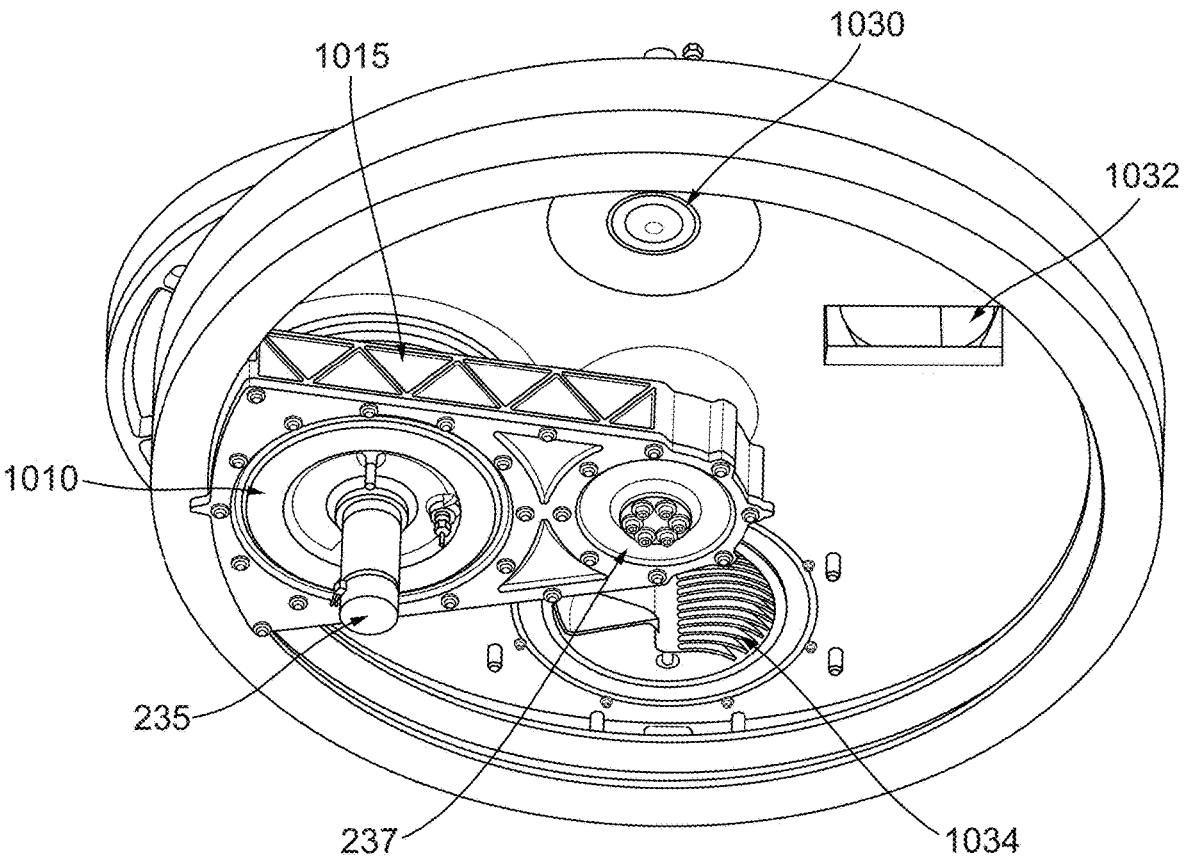
FIG. 10 depicts a bottom angled view of an example of a rotating regolith processing valve integrated into a carbothermal reduction system, the rotating regolith processing valve configured to rotate to the different stations of the carbothermal reduction system.

FIG. 10 depicts a bottom-angled view of an example of a rotating regolith processing valve 1010 integrated into a carbothermal reduction system 100, the rotating regolith processing valve 1010 may be configured to rotate to the different stations of the carbothermal reduction system 100. The rotating regolith processing valve 1010 may be arranged inside a carriage housing 1015 configured to rotate to each of the different stations in the carbothermal reduction system 100. The carriage housing 1015 may pivot from a center portion of the underside of the carbothermal reduction system 100.

The carriage housing 1015 may extend from the center of the underside of the carbothermal reduction system 100 to the perimeter of the underside of the carbothermal reduction system 100. The first end of the carriage housing 1015 may be proximate to the center of the underside of the carbothermal reduction system 100 and the second end of the carriage housing 1015 may be proximate to the perimeter of the underside of the carbothermal reduction system 100. The first end of the carriage housing 1015 may include a rotation motor 237 configured to rotate the carriage housing 1015 around the underside of the carbothermal reduction system 100. The second end of the carriage housing 1015 may include a processing bowl 1110 configured to support regolith as the carriage housing 1015 is rotated around to each of the plurality of stations located around the underside of the carbothermal reduction system 100. The second end may also include a camshaft 235 configured to force a valve interface against a seat 220 located at a station. The camshaft 235 may apply a force in a direction perpendicular to the surface of the underside of the carbothermal reduction system 100.

The underside of the carbothermal reduction system 100 may include a plurality of underside stations. The plurality of underside stations may include a melt underside station 1030, a regolith removal underside station 1034, and a fill station 1032. A controller 410 may be configured to drive, via the rotation motor 237, the carriage housing 1015 to the plurality of stations. The rotating regolith processing valve 1010 may be configured to cycle repeatedly through the plurality of underside stations. The rotation motor 237 of the rotating regolith processing valve 1010 may be configured to rotate the second end of the carriage housing 1015 to align the rotating regolith processing valve 1010 with the plurality of underside stations. In some embodiments, the carriage housing 1015 may be configured to rotate only when the processing bowl is separated from the underside station. In some embodiments, the rotation motor 237 may be configured to rotate the carriage housing 1015 only once a distance threshold is satisfied, the distance threshold corresponding to a distance between the top of the carriage housing 1015 and the surface of the underside of the carbothermal reduction system 100. The top of the carriage housing 1015 does not brush against the underside of the carbothermal processing system.

The rotating regolith processing valve 1010 may include sensors for determining the position and the underside station that is aligned with the carriage housing 1015. The rotating regolith processing valve 1010 may include induction sensors within the carriage housing 1015 to detect the rotation of the rotating regolith processing valve 1010 and/or the distance of the processing bowl 1110 from the seat 220 of the underside station. The induction sensors may use reference points to determine the distance or rotation of the carriage housing 1015. In some embodiments, the rotation motor 237 may be a servo that is configured to provide a rotation angle or radians from a reference point.

Figure 11:
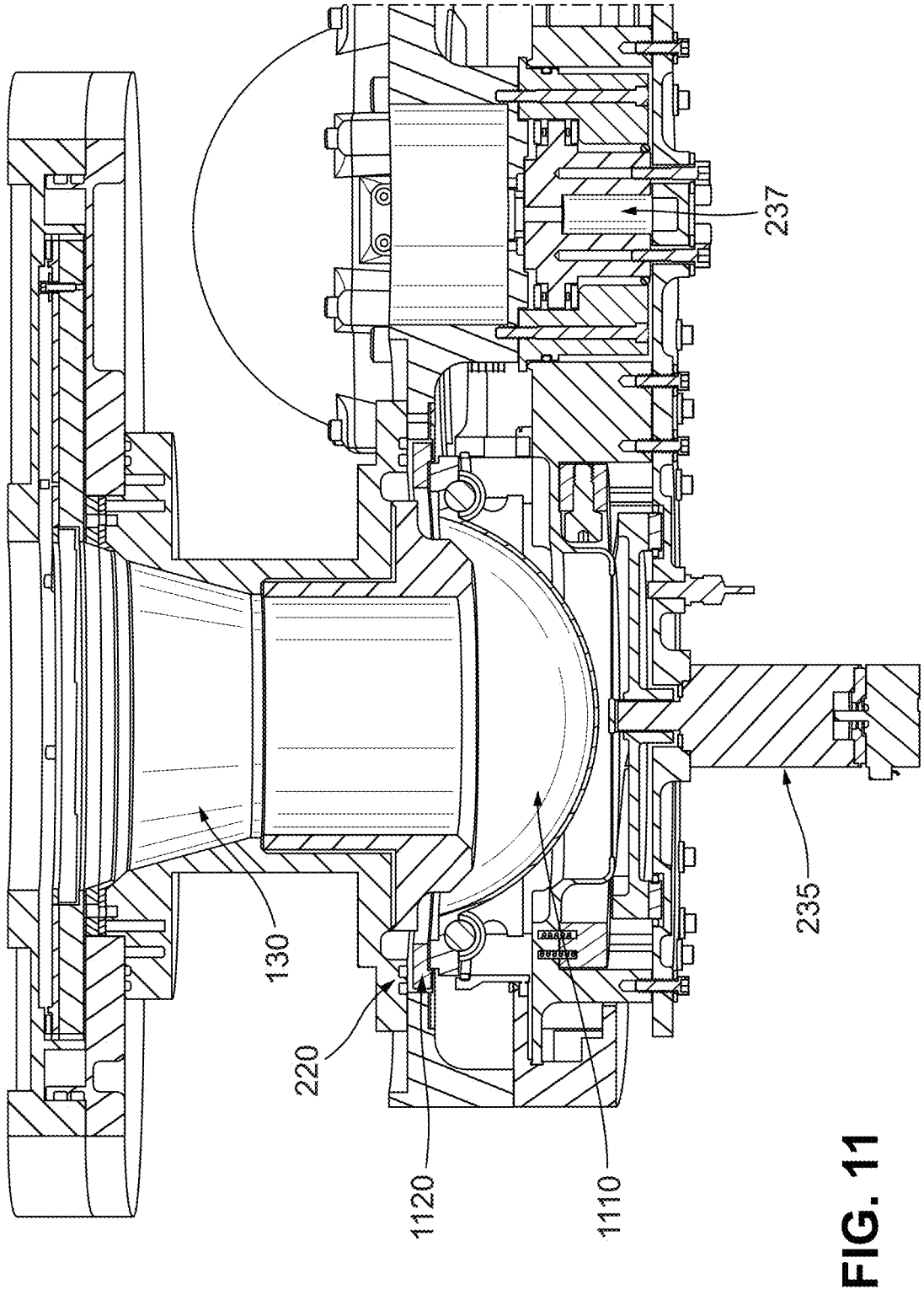
FIG. 11 depicts a cross-section of an example of a rotating regolith processing valve that is included inside the carriage housing.

FIG. 11 depicts a cross-section of an example of a rotating regolith processing valve 1010 that is included inside the carriage housing 1015. The rotating regolith processing valve 1010 may be configured to switch between an open and closed state, tolerate regolith, and create a seal with one or more of the underside stations. Additionally, the lip of the seal pressed against the seat 220 may be configured to protect the components of the rotating regolith processing valve 1010. The lip of the seal may protect the seat 220 from collecting regolith. The lip of the seal and the seat 220 are protected from the concentrated light source by the housing design. The rotating regolith processing valve 1010 may be configured to move up to create the seal and to move down to separate the rotating regolith processing valve 1010 for movement to the next underside station. The rotating regolith processing station may be in an open state after a processing bowl 1110 is decompressed from the seat 220 at the underside station. The rotating regolith processing station may be in a closed state after the processing bowl 1110 is compressed against the seat 220 at the underside station. After processing at one underside station, the bowl may be configured to switch from a closed state to an open state by separating the processing bowl 1110 from the seat 220 of the underside station. The rotating regolith processing valve 1010 may be configured to rotate the processing bowl 1110 around the underside of the carbothermal processing system.

The processing bowl 1110 may be a circular shape and have a dip or trough in the vertical direction. In the closed state, the processing bowl 1110 may be configured to form a seal with the seat 220 of the underside station. In an open state, the processing bowl 1110 may be configured to separate from the seat 220 to be rotated to another station. In some embodiments, the seat 220 may be on the processing bowl 1110 and soft material may be attached to the underside of the reactor 100. To separate the processing bowl 1110 from the seat 220, the camshaft 235 may cease to apply pressure to the processing bowl 1110 and the force from the spring-loaded system 310 may move the processing bowl 1110 away from the seat 220. In the open state, the rotating regolith processing valve 1010 may rotate the processing bowl 1110 from the melt underside station 1030 to the regolith removal underside station.

At the melt underside station 1030, the processing bowl 1110 may be configured to create a seal with the seat 220 of the melt underside station 1030. In some embodiments, the processing bowl 1110 makes a seal with the seat 220 of the melt underside station 1030. In some embodiments, the melt underside station 1030 may be the only station to which the processing bowl 1110 creates a seal. The seal may be created at the melt underside station 1030 to protect the processing bowl 1110 from regolith and dust contamination. For example, in the closed state, the seat 220 and the seat edges may need to be protected from the concentrated light source (e.g., solar heat) as the regolith in the processing bowl 1110 may be exposed to optical light from above.

The bowl may be configured to retract and then rotate in separate independent motions. In some embodiments, there are six pins around the perimeter of the bowl that become a processing station that help push it up vertically. The camshaft 235 is configured to push the pins over the bowl. The camshaft 235 may be configured to couple to the bottom side of the rotating regolith processing valve 1010. The camshaft 235 may be configured to separate the processing bowl 1110 from the seat 220 of the underside station. The camshaft 235 may be configured to move the processing bowl 1110 between the open state and the closed state. The camshaft 235 may be coupled to an aperture in the rotating regolith valve below the processing bowl 1110. The camshaft 235 may include a camshaft motor 239 configured to apply pressure to the processing bowl 1110 for compression against the underside station. In some embodiments, the camshaft 235 may be configured to overcome the force of a spring-loaded system 310 that pushes the valve seal holder 250 away from the seat 220 of the first valve portion 210. The spring-loaded system 310 may separate the processing bowl 1110 from the seat 220 of the underside station. The camshaft 235 may move independently and at separate times from the rotation motor 237 that is configured to rotate the carriage housing 1015 between different underside stations. In some embodiments, the rotation motor 237 may be enabled only in response to the separating of the processing bowl 1110 from the seat 220 of the underside station. The rotation motor 237 may be configured to drive the carriage housing 1015 in either a clockwise direction or a counter-clockwise direction.

The camshaft 235 may be aligned with the processing bowl 1110 to apply force directly and evenly around the processing bowl 1110. In some embodiments, the camshaft motor 239 may overcome the force of the spring-loaded system 310 that separates the processing bowl 1110 from the seat 220. Overcoming the force applied to the processing bowl 1110 by the spring-loaded system 310 may separate a sealing gasket 1120 around the perimeter of the bowl from the scaling gasket 1120 of the perimeter of the seat 220. The spring-loaded system 310 may be aligned with the process-ing bowl 1110 and the underside of the station when the rotating regolith processing valve 1010 is aligned with the underside station. For example, the spring-loaded system 310 may apply force at points aligned with the lip of the seat 220 of the underside station.

Referring to FIG. 12, illustrated is an example of a flowchart of a method configured to compress either the pass-through seal or the closed-off seal to the seat 220 to create a seal. The debris-tolerant valve may provide a non-stop, minimal downtime apparatus designed to maxi-mize the deoxidation process of regolith. The debris-tolerant valve provides minimal production downtime compared to conventional production systems performing carbothermal reduction. The minimal downtime of the debris-tolerant valve is due to the independent movements of the separating of the valve seal holder 250, the rotating of the valve seal holder 250, and the compression of either the pass-through interface 352 or the closed-off interface 354 of the valve seal holder 250 to create a seal at a seat 220 that is an interface for a flow path or a pressurized chamber.

At 1202, the controller 410 may be configured to separate the pass-through interface 352 or the closed-off interface 354 of the valve seal holder 250 from the seat 220 config-ured to interface with an external system having either a flow path or a pressurized chamber. The controller 410 may perform multiple operations while separating the valve seal holder 250 (or the pass-through interface 352 or closed off interface) from the seat 220 using the camshaft 235 and the spring-loaded system 310. The controller 410 may be con-figured to instruct the camshaft 235 to apply force in a direction perpendicular to a surface of the at least one of the pass-through interface 352 or the closed-off interface 354 that can contact the seat 220. Either the pass-through inter-face 352 or the closed-off interface 354 may be decom-pressed in response to separating the pass-through interface 352 and the closed-off interface 354 from the seat 220. The flow path or the pressurized chamber of the external system may be exposed to an ambient environment in response to separating either the pass-through interface 352 and the closed-off interface 354 from the seat 220.

At 1204, the controller 410 may be configured to rotate, using the rotation motor 237, the valve seal holder 250 until at least one of the pass-through interface 352 or the closed-off interface 354 is aligned with the seat 220 configured to interface with the external system having either a flow path or a pressurized chamber. Separating the pass-through inter-face 352 and the closed-off interface 354 from the seat 220 occurs at a different time and is separately actuated from rotating the valve seal holder 250.

At 1206, the controller 410 may be configured to instruct the camshaft 235 to compress, in response to the at least one of the pass-through interface 352 or the closed-off interface 354 being aligned with the seat 220, the at least one of the pass-through interface 352 or the closed-off interface 354 against the seat 220 to create a pressure seal over the seat 220 for protection from debris. In some embodiments, the soft material of the closed-off interface pressed against the seat creates a pressure seal between the ambient environ-ment and either the flow path or the pressurized chamber. In some embodiments, compressing at least one of the pass-through interface 352 or the closed-off interface 354 against the seat 220 to create the seal includes applying force to the valve seal holder 250 in a direction perpendicular to the surface of the at least one of the pass-through interface 352 or the closed-off interface 354 that can contact the seat 220. The spring-loaded system 310 may be configured to apply force to the valve seal holder 250 to separate either the pass-through interface 352 or the closed-off interface 354 from the seat 220. Rotating the valve seal holder 250 occurs at a separate time and is separately actuated from the compressing of the pass-through interface 352 or the closed-off interface 354 against the seat 220 to create the seal.

Referring to FIG. 13, the computing system 1300 may include a processor 1310, a memory 1320, a storage device 1330, and an input/output device 1340. The processor 1310, the memory 1320, the storage device 1330, and the input/output device 1340 may be interconnected via a system bus 1350. The processor 1310 is capable of processing instruc-tions for execution within the computing system 1300. Such executed instructions may implement one or more compo-nents of, for example, a debris-tolerant valve. In some exemplary embodiments, the processor 1310 may be a single-threaded processor. Alternately, the processor 1310 may be a multi-threaded processor. The processor 1310 is capable of processing instructions stored in the memory 1320 and/or on the storage device 1330 to display graphical information for a user interface provided via the input/output device 1340.

The memory 1320 is a non-transitory computer-readable medium that stores information within the computing sys-tem 1300. The memory 1320 may be configured to store data structures representing configuration object databases, for example. The storage device 1330 is capable of providing persistent storage for the computing system 1300. The storage device 1330 may be a floppy disk device, a hard disk device, an optical disk device, or a tape device, or other suitable persistent storage means. The input/output device 1340 provides input/output operations for the computing system 1300. In some exemplary embodiments, the input/output device 1340 includes a keyboard and/or pointing device. In various implementations, the input/output device 1340 includes a display unit for displaying graphical user interfaces.

According to some exemplary embodiments, the input/output device 1340 may provide input/output operations for a network device. For example, the input/output device 1340 may include Ethernet ports or other networking ports to communicate with one or more wired and/or wireless networks (e.g., a local area network (LAN), a wide area network (WAN), the Internet, a public land mobile network (PLMN), and/or the like).

In some exemplary embodiments, the computing system 1300 may be used to execute various interactive computer software applications that may be used for organization, analysis, and/or storage of data in various formats. Alternatively, the computing system 1300 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing items and/or functionalities. Upon activation within the applications, the functionalities may be used to generate the user interface provided via the input/output device 1340. The user interface may be generated and presented to a user by the computing system 1300 (e.g., on a computer screen monitor, etc.).

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

While the foregoing is directed to implementations of the present disclosure, other and further implementations of the disclosure may be devised without departing from the basic scope thereof, and the scope thereof is determined by the claims that follow.

What is claimed is:

1. A valve comprising:

a rotation motor configured to rotate a valve seal holder, the valve seal holder having at least one pass-through interface and closed-off interface;

a camshaft coupled to the valve seal holder, the camshaft configured to selectively compress the at least one of the pass-through interface and the closed-off interface against a seat, the seat being configured to interface with an external system;

a controller communicatively coupled to the camshaft and the rotation motor, the controller configured to:

separate at least one of the pass-through interface or the closed-off interface of the valve seal holder from the seat configured to interface with the external system;

rotate, using the rotation motor, the valve seal holder until at least one of the pass-through interface or the closed-off interface is aligned with the seat; and compress, using the camshaft and in response to the at least one of the pass-through interface or the closed-off interface being aligned with the seat, the at least one of the pass-through interface or the closed-off interface against the seat to create a seal over the seat, wherein the at least one of the pass-through interface or the closed-off interface is wider than the seat, and wherein only a portion of the at least one of the pass-through interface or the closed-off interface is compressed in response to compressing the at least one of the pass-through interface or the closed-off interface to the seat to create the seal.

2. The valve of claim 1, wherein separating the at least one of the pass-through interface and the closed-off interface from the seat occurs at a different time and is separately actuated from the rotating the valve seal holder, and wherein the rotating the valve seal holder occurs at a separate time and is separately actuated from the compressing of the at least one of the pass-through interface or the closed-off interface against the seat to create the seal.

3. The valve of claim 1, wherein separating the at least one of the pass-through interface and the closed-off interface occurs during a first time duration, rotating the valve seal holder occurs during a second time duration, and compressing the at least one of the pass-through interface or the closed-off interface against the seat to create the seal occurs during a third time duration, and wherein the first time duration, the second time duration, and the third time duration do not overlap.

4. The valve of claim 1, wherein the separating the at least one of the pass-through interface and the closed-off interface from the seat using the camshaft further comprises:

applying, using a spring-loaded system, force in a direction perpendicular to a surface of the at least one of the pass-through interface or the closed-off interface that contacts the seat, wherein the at least one of the pass-through interface or the closed-off interface is decompressed in response to separating the at least one of the pass-through interface and the closed-off interface from the seat, and wherein at least one of a flow path or a pressurized chamber of the external system is exposed to an ambient environment in response to separating the at least one of the pass-through interface and the closed-off interface from the seat.

5. The valve of claim 1, wherein the compressing the at least one of the pass-through interface or the closed-off interface against the seat to create the seal further comprises:

applying, by the camshaft, force to the valve seal holder in a direction perpendicular to a surface of the at least one of the pass-through interface or the closed-off interface that contacts the seat.

6. The valve of claim 1, wherein a spring-loaded system is configured to suspend the valve seal holder away from the seat during rotation of the valve seal holder, wherein the valve seal holder does not contact the seat during the rotation of the valve seal holder by the rotation motor, and wherein the external system is exposed to an ambient environment during the rotation of the valve seal holder.

7. The valve of claim 1, further comprising:

a spring-loaded system configured to separate the valve seal holder from the at least one of the pass-through interface or the closed-off interface against the seat, wherein the separating the at least one of the pass-through interface and the closed-off interface from the seat further comprises:

interrupting the force applied by the camshaft; and separating the valve seal holder from the seat using the spring-loaded system.

8. The valve of claim 7, wherein the compressing the at least one of the pass-through interface or the closed-off interface against the seat to create the seal further comprises:

applying, using the camshaft, force in a direction perpendicular to a surface of the at least one of the pass-through interface or the closed-off interface to compress the at least one of the pass-through interface or the closed-off interface against the seat, the force applied by the camshaft being greater than the force applied by the spring-loaded system.

9. The valve of claim 1, wherein the at least one of the pass-through interface or the closed-off interface is made of a soft material, and wherein the pass-through interface, the closed-off interface, and the seat have the same shape.

10. The valve of claim 1, wherein the valve is in an open state in response to creating the seal between the pass-through interface and the seat, and wherein the valve is in a closed state in response to creating the seal between the closed-off interface and the seat.

11. The valve of claim 1, wherein the camshaft is configured to couple to a center aperture of the valve seal holder, wherein the valve seal holder includes a cleaning station configured to remove particles from the seat configured to interface with the external system, and wherein the valve is situated between a hard backdrop and a pressurized volume.

12. The valve of claim 1, wherein the external system has a change in pressure applied in response to creating the seal between the seat and the closed-off interface using the camshaft.

13. The valve of claim 1, wherein the seat does not compress in response to applying force to the valve seal holder, and wherein the seat is metallic.

14. A valve seal holder, the valve seal holder comprising:

a center aperture configured to couple to a rotation motor and a camshaft, the rotation motor configured to rotate the valve seal holder and the camshaft configured to apply force to the valve seal holder; and a plurality of stations arranged on a disc, wherein each of the stations includes at least one of a pass-through interface or a closed-off interface.

15. The valve seal holder of claim 14, wherein the plurality of stations further includes a cleaning station configured to remove particles from a seat configured to interface with an external system.

16. A system comprising:

at least one processor; and at least one non-transitory storage media storing instructions that, when executed by the at least one processor, cause the at least one processor to perform operations configured to:

separate at least one of a pass-through interface and a closed-off interface of a valve seal holder from a seat configured to interface with an external system, the valve seal holder having at least one pass-through interface and closed-off interface;

rotate, using a rotation motor configured to rotate the valve seal holder, the valve seal holder until at least one of the pass-through interface or the closed-off interface is aligned with the seat; and compress, using a camshaft and in response to the at least one of the pass-through interface or the closed-off interface being aligned with the seat, the at least one of the pass-through interface or the closed-off interface against the seat to create a seal over the seat, the camshaft being coupled to the valve seal holder, the camshaft configured to selectively compress the at least one of the pass-through interface and the closed-off interface against the seat, wherein the at least one of the pass-through interface or the closed-off interface is wider than the seat, and wherein only a portion of the at least one of the pass-through interface or the closed-off interface is compressed in response to compressing the at least one of the pass-through interface or the closed-off interface to the seat to create the seal.

17. The system of claim 16, wherein separating the at least one of the pass-through interface and the closed-off interface from the seat occurs at a different time and is separately actuated from the rotating the valve seal holder, and wherein the rotating the valve seal holder occurs at a separate time and is separately actuated from the compressing of the at least one of the pass-through interface or the closed-off interface against the seat to create the seal.

18. The system of claim 16, wherein separating the at least one of the pass-through interface and the closed-off interface occurs over a first time duration, wherein rotating the valve seal holder occurs during a second time duration, and wherein compressing the at least one of the pass-through interface or the closed-off interface against the seat to create the seal occurs during a third time duration, and wherein the first time duration, the second time duration, and the third time duration do not overlap.

19. The system of claim 16, wherein the separating the at least one of the pass-through interface and the closed-off interface from the seat using the camshaft further comprises:

applying, using a spring-loaded system, force in a direction perpendicular to a surface of the at least one of the pass-through interface or the closed-off interface that contacts the seat, wherein the at least one of the pass-through interface or the closed-off interface is decompressed in response to separating the at least one of the pass-through interface and the closed-off interface from the seat, and wherein the external system is exposed to an ambient environment in response to separating the at least one of the pass-through interface and the closed-off interface from the seat.

* * * * *